(12) United States Patent
Burns et al.

(10) Patent No.: US 10,416,760 B2
(45) Date of Patent: Sep. 17, 2019

(54) GAZE-BASED OBJECT PLACEMENT WITHIN A VIRTUAL REALITY ENVIRONMENT

(71) Applicant: MICROSOFT TECHNOLOGY LICENSING, LLC, Redmond, WA (US)

(72) Inventors: Aaron Burns, Newcastle, WA (US); Ben Sugden, Redmond, WA (US); Laura Massey, Redmond, WA (US); Tom Salter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/697,109

(22) Filed: Apr. 27, 2015

(65) Prior Publication Data

US 2016/0026242 A1 Jan. 28, 2016

Related U.S. Application Data

(60) Provisional application No. 62/029,351, filed on Jul. 25, 2014.

(51) Int. Cl.
*G06F 3/01* (2006.01)
*G06F 3/0482* (2013.01)
(Continued)

(52) U.S. Cl.
CPC ........... *G06F 3/013* (2013.01); *G02B 27/017* (2013.01); *G02B 27/0172* (2013.01);
(Continued)

(58) Field of Classification Search
CPC .... H04N 9/31; G02B 27/0172; G02B 27/017; G02B 27/0093; G02B 2027/0178;
(Continued)

(56) References Cited

U.S. PATENT DOCUMENTS 5,748,189 A 5/1998 Trueblood
5,819,206 A 10/1998 Horton et al.
(Continued)

FOREIGN PATENT DOCUMENTS

CN 1922651 A 2/2007
CN 101162524 A 4/2008
(Continued)

OTHER PUBLICATIONS

"International Preliminary Report on Patentability Issued in PCT Application No. PCT/US2015/041868", dated Oct. 28, 2015, (10 Pages total).
(Continued)

*Primary Examiner* — Chong Wu
(74) *Attorney, Agent, or Firm* — Mark K. Young; Mayer & Williams PC

(57) ABSTRACT

A head mounted display (HMD) device operating in a real world physical environment is configured with a sensor package that enables determination of an intersection of a device user's projected gaze with a location in a virtual reality environment so that virtual objects can be placed into the environment with high precision. Surface reconstruction of the physical environment can be applied using data from the sensor package to determine the user's view position in the virtual world. A gaze ray originating from the view position is projected outward and a cursor or similar indicator is rendered on the HMD display at the ray's closest intersection with the virtual world such as a virtual object, floor/ground, etc. In response to user input, such as a gesture, voice interaction, or control manipulation, a virtual object is placed at the point of intersection between the projected gaze ray and the virtual reality environment.

17 Claims, 25 Drawing Sheets

(51) Int. Cl.
  *G06T 19/00* (2011.01)
  *G02B 27/01* (2006.01)
  *H04N 9/31* (2006.01)
  *G02B 27/00* (2006.01)

(52) U.S. Cl.
  CPC .............. *G06F 3/011* (2013.01); *G06F 3/012* (2013.01); *G06F 3/0482* (2013.01); *G06T 19/00* (2013.01); *G06T 19/006* (2013.01); *H04N 9/31* (2013.01); *G02B 27/0093* (2013.01); *G02B 2027/0178* (2013.01); *G02B 2027/0187* (2013.01)

(58) Field of Classification Search
  CPC ........ G06F 3/011; G06F 3/012; G06F 3/0482; G06F 3/013; G06T 19/00; G06T 19/006
  See application file for complete search history.

(56) References Cited

U.S. PATENT DOCUMENTS

| | | |
|---|---|---|
| 5,877,748 A | 3/1999 | Redlich |
| 6,012,926 A | 1/2000 | Hodges et al. |
| 6,023,275 A | 2/2000 | Horvitz |
| 6,329,986 B1 | 12/2001 | Cheng |
| 6,396,495 B1 | 5/2002 | Parghi et al. |
| 6,396,497 B1 | 5/2002 | Reichlen |
| 6,529,331 B2 | 3/2003 | Massof et al. |
| 6,552,698 B1 | 4/2003 | Walker |
| 6,741,241 B1 | 5/2004 | Jaubert et al. |
| 6,804,607 B1 | 10/2004 | Wood |
| 6,898,266 B2 | 5/2005 | Griffith |
| 7,274,380 B2 | 9/2007 | Navab et al. |
| 7,386,799 B1 | 6/2008 | Clanton et al. |
| 7,400,322 B1 | 7/2008 | Urbach |
| 7,486,817 B2 | 2/2009 | Yanagawa et al. |
| 7,538,775 B2 | 5/2009 | Ishihara |
| 7,542,210 B2 | 6/2009 | Chirieleison, Sr. |
| 7,557,774 B2 | 7/2009 | Baudisch et al. |
| 8,049,750 B2 | 11/2011 | Gloudemans et al. |
| 8,266,536 B2 | 9/2012 | Roberts et al. |
| 8,405,680 B1 | 3/2013 | Cardoso Lopes |
| 8,576,247 B2 | 11/2013 | Avkarogullari et al. |
| 8,611,015 B2 | 12/2013 | Wheeler et al. |
| 8,751,969 B2 | 6/2014 | Matsuda et al. |
| 8,754,931 B2 | 6/2014 | Gassel et al. |
| 8,780,014 B2 | 7/2014 | Border et al. |
| 8,793,620 B2 | 7/2014 | Stafford |
| 9,372,345 B2 | 6/2016 | Fujimaki |
| 9,443,352 B1 | 9/2016 | Glover |
| 9,645,397 B2 | 5/2017 | da Veiga et al. |
| 9,776,460 B2 | 10/2017 | Mita |
| 9,858,720 B2 | 1/2018 | da Veiga et al. |
| 9,865,089 B2 | 1/2018 | Burns et al. |
| 9,904,055 B2 | 2/2018 | Burns et al. |
| 2001/0035845 A1 | 11/2001 | Zwern |
| 2002/0044152 A1 | 4/2002 | Abbott et al. |
| 2002/0154214 A1 | 10/2002 | Scallie et al. |
| 2002/0181115 A1 | 12/2002 | Massof et al. |
| 2003/0091226 A1 | 5/2003 | Cahill |
| 2005/0024388 A1 | 2/2005 | Takemoto |
| 2005/0143887 A1 | 6/2005 | Kinoshita |
| 2005/0179703 A1 | 8/2005 | Johnson |
| 2006/0050070 A1 | 3/2006 | Matsui |
| 2006/0092178 A1 | 5/2006 | Tanguay, Jr. |
| 2006/0095207 A1 | 5/2006 | Reid |
| 2006/0241827 A1 | 10/2006 | Fukuchi |
| 2006/0284792 A1 | 12/2006 | Foxlin |
| 2007/0057946 A1 | 3/2007 | Albeck |
| 2007/0116326 A1 | 5/2007 | Aonuma et al. |
| 2007/0132662 A1 | 6/2007 | Morita |
| 2008/0174659 A1 | 7/2008 | McDowall |
| 2008/0195315 A1 | 8/2008 | Hu |
| 2008/0284864 A1 | 11/2008 | Kotake |
| 2009/0160985 A1 | 6/2009 | Javidi |
| 2009/0167785 A1 | 7/2009 | Wong |
| 2009/0189974 A1 | 7/2009 | Deering |
| 2009/0199275 A1 | 8/2009 | Brock et al. |
| 2009/0325699 A1 | 12/2009 | Delgiannidis |
| 2010/0208035 A1 | 8/2010 | Pinault |
| 2010/0208057 A1 | 8/2010 | Meier |
| 2010/0226017 A1 | 9/2010 | Spaller |
| 2010/0315413 A1 | 12/2010 | Izadi et al. |
| 2011/0029903 A1 | 2/2011 | Schooleman et al. |
| 2011/0043627 A1 | 2/2011 | Werling et al. |
| 2011/0140994 A1 | 6/2011 | Noma |
| 2011/0242090 A1 | 10/2011 | Keating et al. |
| 2012/0011445 A1 | 1/2012 | Gilboa |
| 2012/0052917 A1 | 3/2012 | Kim |
| 2012/0056876 A1 | 3/2012 | Lee et al. |
| 2012/0068913 A1 | 3/2012 | Bar-Zeev et al. |
| 2012/0092328 A1 | 4/2012 | Flaks |
| 2012/0113092 A1 | 5/2012 | Bar-Zeev et al. |
| 2012/0195471 A1 | 8/2012 | Newcombe |
| 2012/0237116 A1 | 9/2012 | Xiao |
| 2012/0249741 A1 | 10/2012 | Maciocci |
| 2012/0309522 A1 | 12/2012 | Westlund et al. |
| 2012/0313839 A1 | 12/2012 | Smithwick |
| 2012/0327116 A1 | 12/2012 | Liu et al. |
| 2013/0044128 A1 | 2/2013 | Liu et al. |
| 2013/0050258 A1 | 2/2013 | Liu et al. |
| 2013/0050432 A1 | 2/2013 | Perez et al. |
| 2013/0083007 A1 | 4/2013 | Geisner et al. |
| 2013/0083018 A1 | 4/2013 | Geisner |
| 2013/0088413 A1 | 4/2013 | Raffle et al. |
| 2013/0093789 A1 | 4/2013 | Liu et al. |
| 2013/0127860 A1 | 5/2013 | Hadap |
| 2013/0127980 A1 | 5/2013 | Haddick |
| 2013/0137076 A1 | 5/2013 | Perez et al. |
| 2013/0141419 A1 | 6/2013 | Mount |
| 2013/0147686 A1 | 6/2013 | Clavin et al. |
| 2013/0194259 A1 | 8/2013 | Bennett et al. |
| 2013/0222589 A1 | 8/2013 | Lalonde et al. |
| 2013/0222647 A1 | 8/2013 | Ishihara |
| 2013/0257751 A1 | 10/2013 | Stafford |
| 2013/0257899 A1 | 10/2013 | Baron et al. |
| 2013/0287290 A1 | 10/2013 | Owechko |
| 2013/0300637 A1 | 11/2013 | Smits et al. |
| 2013/0307855 A1 | 11/2013 | Lamb et al. |
| 2013/0326364 A1 | 12/2013 | Latta et al. |
| 2013/0328927 A1 | 12/2013 | Mount et al. |
| 2013/0335301 A1 | 12/2013 | Wong |
| 2013/0335303 A1 | 12/2013 | Maciocci et al. |
| 2013/0336629 A1 | 12/2013 | Mulholland et al. |
| 2013/0342564 A1 | 12/2013 | Kinnebrew et al. |
| 2013/0342570 A1 | 12/2013 | Kinnebrew et al. |
| 2014/0002444 A1 | 1/2014 | Bennett et al. |
| 2014/0019874 A1 | 1/2014 | Li et al. |
| 2014/0049559 A1 | 2/2014 | Fleck et al. |
| 2014/0098009 A1 | 4/2014 | Prest |
| 2014/0104142 A1 | 4/2014 | Bickerstaff et al. |
| 2014/0125557 A1 | 5/2014 | Issayeva et al. |
| 2014/0130041 A1 | 5/2014 | Luxenberg et al. |
| 2014/0132484 A1 | 5/2014 | Pandey |
| 2014/0132715 A1 | 5/2014 | Raghoebardayal |
| 2014/0139639 A1 | 5/2014 | Wagner |
| 2014/0140579 A1 | 5/2014 | Takemoto |
| 2014/0145988 A1 | 5/2014 | Ishizawa |
| 2014/0168264 A1 | 6/2014 | Harrison |
| 2014/0176530 A1 | 6/2014 | Path re |
| 2014/0184550 A1 | 7/2014 | Hennessey et al. |
| 2014/0204117 A1 | 7/2014 | Kinnebrew et al. |
| 2014/0221090 A1 | 8/2014 | Mutschler et al. |
| 2014/0240351 A1 | 8/2014 | Scavezze et al. |
| 2014/0253605 A1 | 9/2014 | Border et al. |
| 2014/0267400 A1 | 9/2014 | Mabbutt |
| 2014/0317555 A1 | 10/2014 | Choi et al. |
| 2014/0363073 A1 | 12/2014 | Shirakyan |
| 2014/0372957 A1 | 12/2014 | Keane et al. |
| 2015/0070274 A1 | 3/2015 | Morozov |
| 2015/0091780 A1* | 4/2015 | Lyren .................. G02B 27/017 345/8 |
| 2015/0138081 A1 | 5/2015 | Iwatsu et al. |
| 2015/0138239 A1 | 5/2015 | Kim |

(56) References Cited

U.S. PATENT DOCUMENTS

| | | |
|---|---|---|
| 2015/0143459 A1 | 5/2015 | Molnar |
| 2015/0145887 A1 | 5/2015 | Forutanpour |
| 2015/0153833 A1 | 6/2015 | Pinault et al. |
| 2015/0178956 A1 | 6/2015 | Davis |
| 2015/0186016 A1 | 7/2015 | Li |
| 2015/0205106 A1 | 7/2015 | Norden |
| 2015/0243078 A1 | 8/2015 | Watson |
| 2015/0261293 A1 | 9/2015 | Wilairat |
| 2015/0325176 A1 | 11/2015 | Koyama |
| 2015/0355709 A1 | 12/2015 | Lee et al. |
| 2015/0355735 A1 | 12/2015 | Matsuda |
| 2015/0356788 A1 | 12/2015 | Abe |
| 2016/0011724 A1 | 1/2016 | Wheeler et al. |
| 2016/0025981 A1 | 1/2016 | Burns et al. |
| 2016/0025982 A1 | 1/2016 | Sutherland et al. |
| 2016/0027212 A1 | 1/2016 | Da veiga et al. |
| 2016/0027213 A1 | 1/2016 | Burns et al. |
| 2016/0027214 A1 | 1/2016 | Memmott et al. |
| 2016/0027215 A1 | 1/2016 | Burns et al. |
| 2016/0027216 A1 | 1/2016 | da veiga et al. |
| 2016/0027217 A1 | 1/2016 | da veiga et al. |
| 2016/0027218 A1 | 1/2016 | Salter et al. |
| 2016/0314622 A1 | 10/2016 | Davis et al. |
| 2018/0003982 A1 | 1/2018 | Burns et al. |
| 2018/0101994 A1 | 4/2018 | Da veiga et al. |

FOREIGN PATENT DOCUMENTS

| | | |
|---|---|---|
| CN | 101529899 A | 9/2009 |
| CN | 101813976 A | 8/2010 |
| CN | 102419631 A | 4/2012 |
| CN | 102473068 A | 5/2012 |
| CN | 102598677 A | 7/2012 |
| CN | 101540020 B | 9/2012 |
| CN | 102663722 A | 9/2012 |
| CN | 102918568 A | 2/2013 |
| CN | 102959616 A | 3/2013 |
| CN | 103064188 A | 4/2013 |
| CN | 103076875 A | 5/2013 |
| CN | 103091844 A | 5/2013 |
| CN | 103377476 A | 10/2013 |
| CN | 103460256 A | 12/2013 |
| CN | 103487937 A | 1/2014 |
| CN | 103493106 A | 1/2014 |
| CN | 103635849 A | 3/2014 |
| CN | 103761085 A | 4/2014 |
| CN | 106662924 A | 5/2017 |
| EP | 1521482 A2 | 4/2005 |
| EP | 2164045 A2 | 3/2010 |
| JP | 2013238693 A | 11/2013 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

"International Preliminary Report on Patentability Issued in PCT Application No. PCT/US2015/041864", dated Oct. 26, 2015, (11 Pages total).

"International Search Report and Written Opinion Issued in PCT Application No. PCT/US2015/041865", dated Jan. 25, 2016, 12 Pages.

"International Search Report & Written Opinion Issued in PCT Patent Application No. PCT/US2015/041866", dated Nov. 27, 2015, 12 Pages.

"Second Written Opinion Issued in PCT Application No. PCT/US2015/041868", dated Jul. 1, 2016, (6 Pages).

"Second Written Opinion Issued in PCT Application No. PCT/US2015/041866", dated Jun. 27, 2016, 7 Pages.

"Second Written Opinion Issued in PCT Application PCT/US2015/041865", dated Jun. 15, 2016, 8 Pages.

Duchowski, Andrew, "Chapter 7—Head-Mounted System Software Development", In Book Eye Tracking Methodology, Theory and Practice, Part 2, Jan. 1, 2007, pp. 69-86. (18 pages total).

"Second Written Opinion Issued in PCT Application No. PCT/US2015/041862", dated Jun. 13, 2016, 5 Pages.

"Second Written Opinion Issued in PCT Application No. PCT/US2015/041863", dated Jun. 15, 2016, 7 Pages.

"Second Written Opinion Issued in PCT Application No. PCT/US2015/041861", dated Jun. 20, 2016, 6 Pages.

"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © 2000 IEEE) (10 pages total).

Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.

Murray, et al., "Comparison of Head Gaze and Head and Eye Gaze within an Immersive Environment", In Tenth IEEE International Symposium on Distributed Simulation and Real-Time Applications , Oct. 2, 2006, 7 pages.

Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.

Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.

Ponto, et al., "Perceptual Calibration for Immersive Display Environments", In IEEE Transactions on Visualization and Computer Graphics, vol. 19, Issue 4, Apr. 2013, pp. 691-700, 10 pages.

Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.

Li, et al., "The Underestimation of Egocentric Distance: Evidence from Frontal Matching Tasks", In Proceedings of Attention, Perception & Psychophysics, Oct. 2011, 15 pages.

Howe, Bo, "Holographic Computer Monitor", Published on: Aug. 18, 2010, Available at: www.youtube.com/watch?v=tHlxj7fY-38, 2 pages.

Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.

Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.

Chen, Jian, "A Virtual Environment System for the Comparative Study of Dome and HMD", In Master Thesis, Department of Computer Science, University of Houston, May, 2002, 104 pages.

McCarthy, Mike, "HP intros new versions of its mobile and tower workstations", Retrieved on: Sep. 11, 2014, Available at: http://postperspective.com/hp-intros-new-versions-pro-offerings/, 5 pages.

Nakashima, et al., "A 2D-3D Integrated Environment for Cooperative Work", In Proceedings of the Virtual Reality Software and Technology, Nov. 7, 2005, 7 pages.

Pierce, et al., "Image Plane Interaction Techniques in 3D Immersive Environments", In Proceedings of the symposium on Interactive 3D graphics, Apr. 30, 1997, 10 pages.

Regenbrecht, et al., "Interaction in a Collaborative Augmented Reality Environment", In Proceedings of CHI Extended Abstracts on Human Factors in Computing Systems, Apr. 20, 2002, 2 pages.

"Touchscreen interface for seamless data transfer between the real and virtual worlds", Published on: Apr. 15, 2013, Available at: http://www.diginfo.tv/v/13/0025-r-en.php, 8 pages.

(56) References Cited

OTHER PUBLICATIONS

Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.
Steinicke, et al. "Natural Perspective Projections for Head-Mounted Displays", In IEEE Transactions on Visualization and Computer Graphics, Jul. 2011, 12 pages.
Hogue, David, "What Are Index and Alpha Transparency?", Published on: Mar. 3, 2011, Available at: http://www.idux.com/2011/02/27/what-are-index-and-alpha-transparency/, 14 pages.
Jimenez, et al., "Gaze-based Interaction for Virtual Environments", In Journal of Universal Computer Science, vol. 14, Issue 19, Nov. 2008, 14 pages.
Kinoshita, et al., "A Fast and Robust 3D Head Pose and Gaze Estimation System", In 8th IEEE International Conference on Automatic Face & Gesture Recognition, Sep. 17, 2008, 2 pages.
Peterson, et al., "Evaluation of Alternative Label Placement Techniques in Dynamic Virtual Environments", In Proceedings of the 10th International Symposium on Smart Graphics, May 22, 2009, 7 pages.
Kuhl, et al., "HMD Calibration and its Effects on Distance Judgments", In Proceedings of the 5th symposium on Applied perception in graphics and visualization, Aug. 9, 2008, 24 pages.
Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.
Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.
Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.
Nóbrega, et al., "Magnetic Augmented Reality: Virtual Objects in Your Space", In Proceedings of the International Working Conference on Advanced Visual Interfaces, May 21, 2012, pp. 332-335, 4 pages.
Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.
Kalkofen, et al., "Visualization Techniques for Augmented Reality", In Proceedings of Handbook of Augmented Reality, Jul. 13, 2011, pp. 65-98, 34 pages.
Maimone, et al., "Computational Augmented Reality Eyeglasses", In Proceedings of IEEE International Symposium on Mixed and Augmented Reality, Oct. 1, 2013, 10 pages.
"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).
"International Search Report and Written Opinion Issued in PCT Patent Application No. PCT/US2015/041861", dated Oct. 30, 2015, (11 pages total).
"International Search Report and Written Opinion Issued in PCT Application No. PCT1US2015/041867", dated Nov. 25, 2015, (11 Pages total).
"International Search Report & Written Opinion Received for PCT Application No. PCT/US2015/041863",dated Nov. 16, 2015, (12 Pages total).
"International Search Report & Written Opinion Issued in PCT Application No. PCT/US2015/041862", dated Nov. 16, 2015, (11 Pages total).
"International Preliminary Report on Patentability Issued in PCT Application No. PCT/US2015/041868", dated Oct. 13, 2016, 8 Pages.
"International Preliminary Report on Patentability Issued in PCT Application No. PCT/US2015/041863", dated Oct. 13, 2016, 8 Pages.
"International Preliminary Report on Patentability Issued in PCT Application No. PCT/US2015/041862", dated Oct. 13, 2016, 6 Pages.
"International Preliminary Report on Patentability Issued in PCT Application No. PCT/US2015/041861", dated Oct. 13, 2016, 7 Pages.
"International Preliminary Report on Patentability Issued in PCT Application No. PCT/US2015/041865", dated Oct. 19, 2016, 7 Pages.
"International Preliminary Report on Patentability Issued in PCT Application No. PCT/US2015/041866", dated Oct. 27, 2016, 9 Pages.
"Final Office Action Issued in U.S. Appl. No. 14/723,065", dated Dec. 21, 2017, 42 Pages.
"Non Final Office Action Issued in U.S. Appl. No. 15/841,047", dated Jan. 25, 2018, 85 Pages.
Non-Final Office Action received in U.S. Appl. No. 15/679,997, dated Oct. 19, 2017, 41 pages.
Final Office Action received in U.S. Appl. No. 14/722,942, dated Nov. 24, 2017, 14 pages.
Notice of Allowance received in U.S. Appl. No. 14/612,850, dated Oct. 12, 2017, 9 pages.
"Non Final Office Action issued in U.S. Appl. No. 14/628,539", dated Jun. 27, 2018, 29 Pages.
"Non Final Office Action Issued in U.S. Appl. No. 14/723,065", dated May 2, 2018, 41 Pages.
"Non Final Office Action Issued in U.S. Appl. No. 14/600,774", dated May 17, 2018, 35 Pages.
"Final Office Action Issued in U.S. Appl. No. 14/600,774", dated Oct. 13, 2017, 36 Pages.
"Final Office Action Issued in U.S. Appl. No. 14/600,774", dated Oct. 5, 2018, 32 Pages.
"Non Final Office Action Issued in U.S. Appl. No. 14/600,774", dated Mar. 24, 2017, 29 Pages.
"Non Final Office Action Issued in U.S. Appl. No. 14/611,447", dated Dec. 27, 2016, 20 Pages.
"Final Office Action Issued in U.S. Appl. No. 14/612,850", dated Jan. 12, 2017, 15 Pages.
"Non Final Office Action Issued in U.S. Appl. No. 14/612,850", dated Jun. 26, 2017, 15 Pages.
"Non Final Office Action Issued in U.S. Appl. No. 14/612,850", dated Jun. 23, 2016, 17 Pages.
"Final Office Action Issued in U.S. Appl. No. 14/628,539", dated Apr. 7, 2017, 20 Pages.
"Final Office Action Issued in U.S. Appl. No. 14/628,539", dated Jan. 22, 2018, 29 Pages.
"Non-final Office Action Issued in U.S. Appl. No. 14/628,539", dated Sep. 14, 2017, 24 Pages.
"Non-final Office Action Issued in U.S. Appl. No. 14/628,539", dated Nov. 17, 2016, 17 Pages.
"Final Office Action Issued in U.S. Appl. No. 14/688,695", dated Nov. 4, 2016, 21 Pages.
"Non Final Office Action Issued in U.S. Appl. No. 14/688,695", dated Mar. 20, 2017, 24 Pages.
"Non Final Office Action Issued in U.S. Appl. No. 14/688,695", dated Jul. 12, 2016, 20 Pages.
"Notice of Allowance Issued in U.S. Appl. No. 14/688,695", dated Aug. 29, 2017, 12 Pages.
"Final Office Action Issued in U.S. Appl. No. 14/688,817", dated Dec. 22, 2016, 56 Pages.
"Non Final Office Action Issued in U.S. Appl. No. 14/688,817", dated Mar. 23, 2017, 57 Pages.
"Non Final Office Action Issued in U.S. Appl. No. 14/688,817", dated Aug. 4, 2016, 50 Pages.
"Non Final Office Action Issued in U.S. Appl. No. 14/697,227", dated Aug. 12, 2016, 17 Pages.
"Final Office Action Issued in U.S. Appl. No. 14/722,942", dated Sep. 19, 2018, 11 Pages.
"Non Final Office Action Issued in U.S. Appl. No. 14/722,942", dated Jul. 11, 2017, 11 Pages.

(56) References Cited

OTHER PUBLICATIONS

"Non Final Office Action Issued in U.S. Appl. No. 14/722,942", dated Apr. 4, 2018, 12 Pages.
"Final Office Action Issued in U.S. Appl. No. 14/723,065", dated Feb. 7, 2017, 37 Pages.
"Non Final Office Action Issued in U.S. Appl. No. 14/723,065", dated Jul. 24, 2017, 38 Pages.
"Non Final Office Action Issued in U.S. Appl. No. 14/723,065", dated Sep. 26, 2016, 29 Pages.
"Final Office Action Issued in U.S. Appl. No. 15/679,997", dated Apr. 5, 2018, 17 Pages.
"Office Action Issued in Chinese Patent Application No. 201580041327.6", dated Dec. 5, 2018, 20 Pages.
"Office Action Issued in Chinese Patent Application No. 201580041345.4", dated Dec. 5, 2018, 19 Pages.
"Office Action Issued in Chinese Patent Application No. 201580041348.8", dated Nov. 30, 2018, 15 Pages.
"Office Action Issued in Chinese Patent Application No. 201580041349.2", dated Dec. 5, 2018, 19 Pages.
"Office Action Issued in Chinese Patent Application No. 201580041369.X", dated Dec. 6, 2018, 10 Pages.
"Office Action Issued in Colombian Patent Application No. NC2017/0000546", dated Apr. 13, 2018, 14 Pages.
"Office Action Issued in Colombian Patent Application No. NC2017/0000546", dated Sep. 14, 2018, 3 Pages.
"Office Action Issued in Colombian Patent Application No. NC2017/0000546", dated Jan. 25, 2017, 2 Pages. (w/o English Translation).
"Non Final Office Action Issued in U.S. Appl. No. 15/679,997", dated Dec. 13, 2018, 15 Pages.
"Office Action Issued in Chinese Patent Application No. 201580041151.4", dated Dec. 21, 2018, 29 Pages.
"Office Action Issued in Chinese Patent Application No. 201580041403.3", dated Dec. 21, 2018, 18 Pages.
"Office Action Issued in European Patent Application No. 15748368.6", dated Feb. 15, 2019, 5 Pages.
"Office Action Issued in European Patent Application No. 15748367.8", dated Apr. 8, 2019, 6 Pages.
"First Office Action and Search Report Issued in Chinese Patent Application No. 201580041217.X", dated Feb. 28, 2019, 22 Pages.
"Office Action Issued in European Patent Application No. 15748369.4", dated Apr. 11, 2019, 5 Pages.
"Office Action Issued in European Patent Application No. 15763668.9", dated Apr. 9, 2019, 5 Pages.
"Second Office Action Issued in Chinese Patent Application No. 201580041327.6", dated Jun. 11, 2019, 7 Pages.
"Second Office Action Issued in Chinese Patent Application No. 201580041345.4", dated Jun. 11, 2019, 7 Pages.
"Final Office Action Issued in U.S. Appl. No. 15/679,397", dated Jun. 26, 2019, 15 Pages.
"Second Office Action Issued in Chinese Patent Application No. 201580041348.8", dated Jul. 8, 2019, 7 Pages.
"Second Office Action Issued in Chinese Patent Application No. 201580041349.2", dated Jul. 8, 2019, 7 Pages.
"Second Office Action Issued in Chinese Patent Application No. 201580041403.3", dated Jul. 8, 2019, 7 Pages.

* cited by examiner

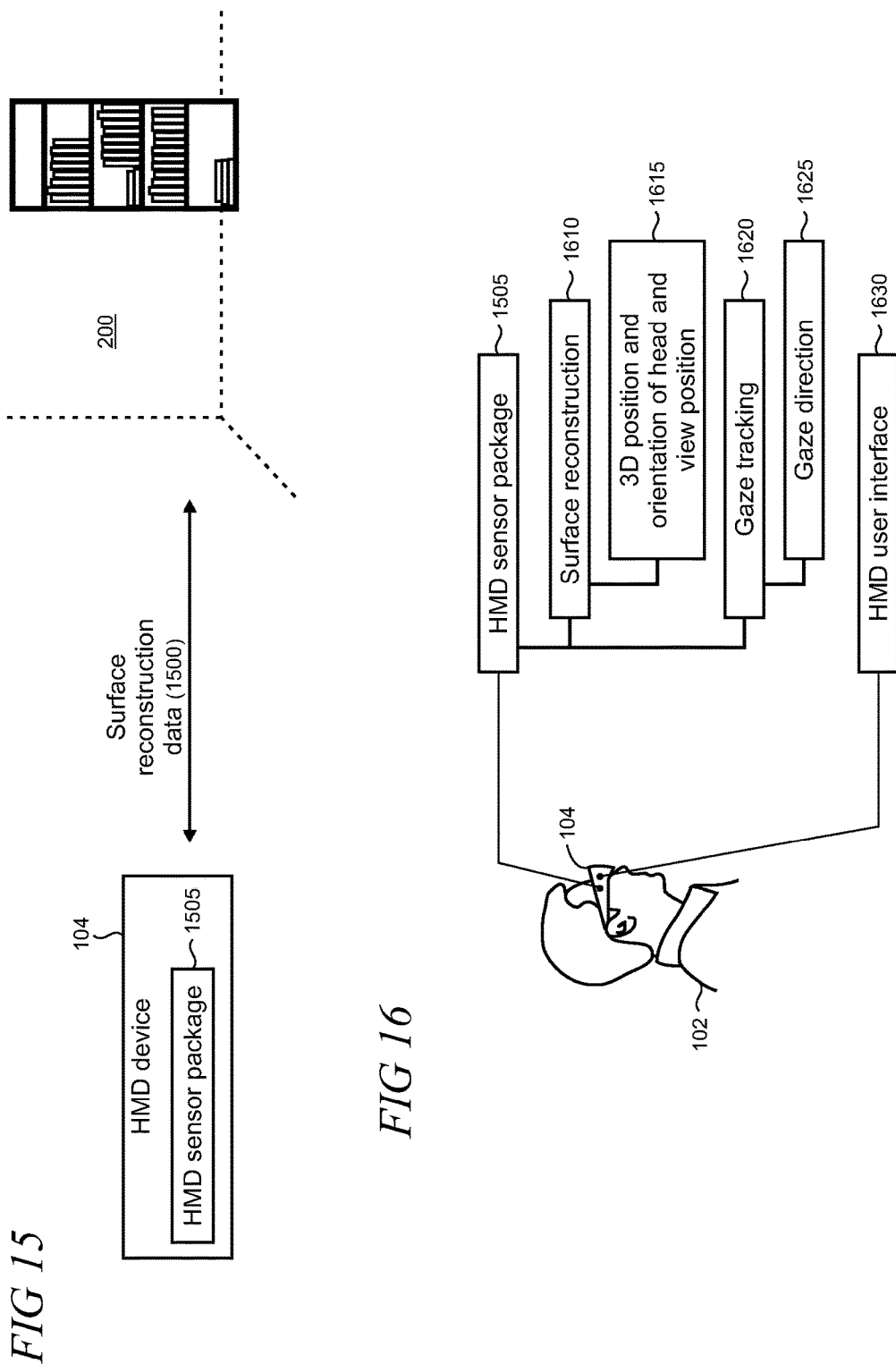

GAZE-BASED OBJECT PLACEMENT WITHIN A VIRTUAL REALITY ENVIRONMENT

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Virtual reality computing devices, such as head mounted display (HMD) systems and handheld mobile devices (e.g. smart phones, tablet computers, etc.), may be configured to display a virtual reality environment to a user in the field of view of the user and/or a field of view of a camera of the device. Similarly, a mobile device may display such information using a camera viewfinder window.

This Background is provided to introduce a brief context for the Summary and Detailed Description that follow. This Background is not intended to be used as an aid in determining the scope of the claimed subject matter nor be viewed as limiting the claimed subject matter to implementations that solve any or all of the disadvantages or problems presented above.

SUMMARY

An HMD device operating in a real world physical environment is configured with a sensor package that enables determination of an intersection of a device user's projected gaze with a location in a virtual reality environment so that virtual objects can be placed into the environment with high precision. Surface reconstruction of the physical environment can be applied using data from the sensor package to determine the user's view position in the virtual world. A gaze ray originating from the view position is projected outward and a cursor or similar indicator is rendered on the HMD display at the ray's closest intersection with the virtual world such as a virtual object, floor/ground, etc. In response to user input, such as a gesture, voice interaction, or manipulation of a control (e.g., a button or other user interface object), a virtual object is placed at the point of intersection between the projected gaze ray and the virtual reality environment.

The present gaze-based virtual object placement can be used in a variety of applications and use scenarios and enables the user to easily position virtual objects at desired locations in the virtual environment by changing view position and/or gaze. For example, an HMD device user can place markers to indicate points of interest on virtual world terrain in a surveying or mapping application, or a user can place virtual objects such as avatars and game objects at particular positions in the virtual world as part of the gameplay in a gaming scenario.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 15 depicts surface reconstruction data associated with a real world environment being captured by an HMD device;

FIG. 16 shows an illustrative user interface supported by an HMD device and illustrative data provided by an HMD sensor package;

Like reference numerals indicate like elements in the drawings. Elements are not drawn to scale unless otherwise indicated.

DETAILED DESCRIPTION

Figure 1:
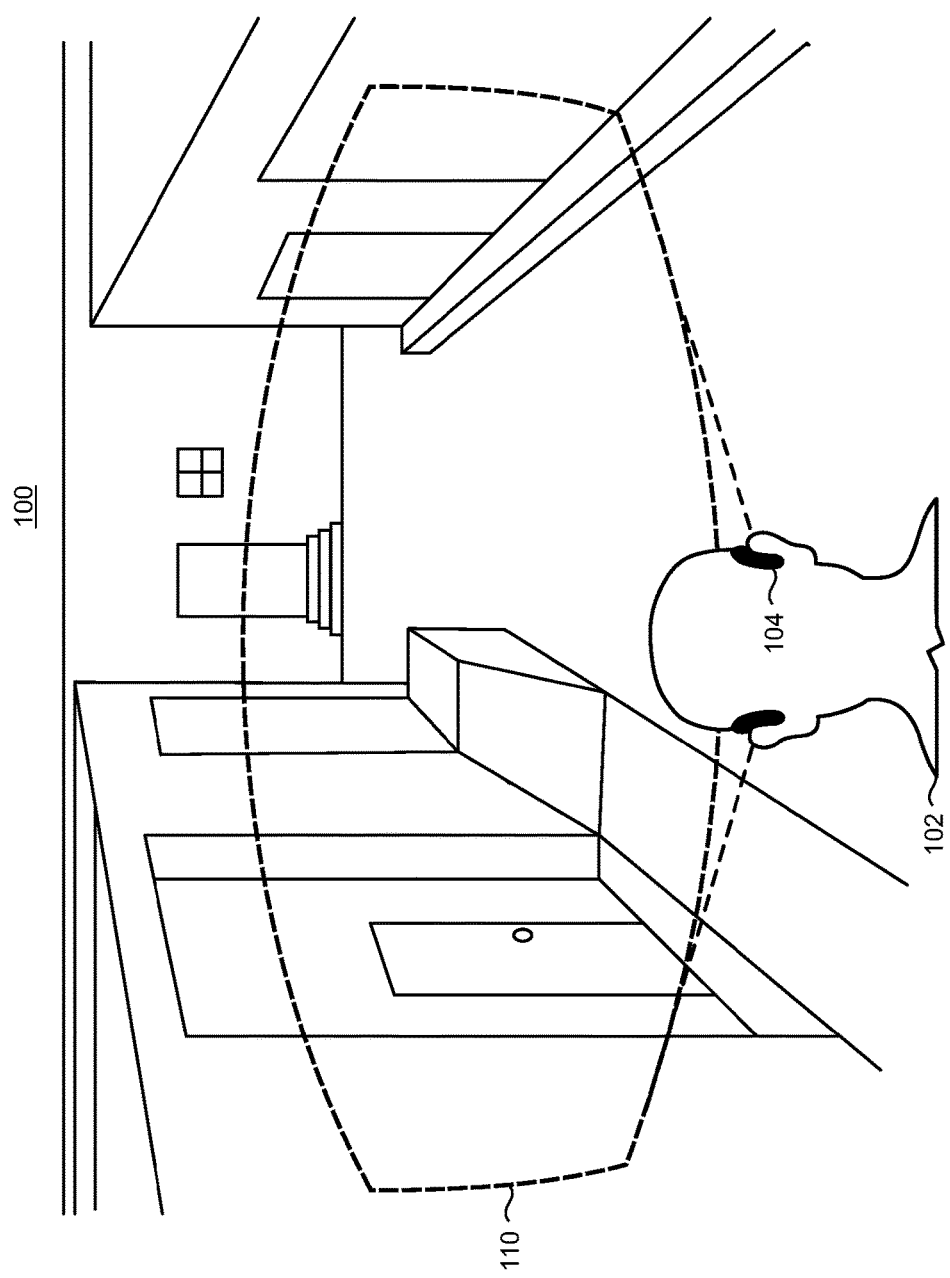
FIG. 1 shows an illustrative virtual reality environment, a portion of which is rendered within the field of view of a user of an HMD device.
Figure 2:
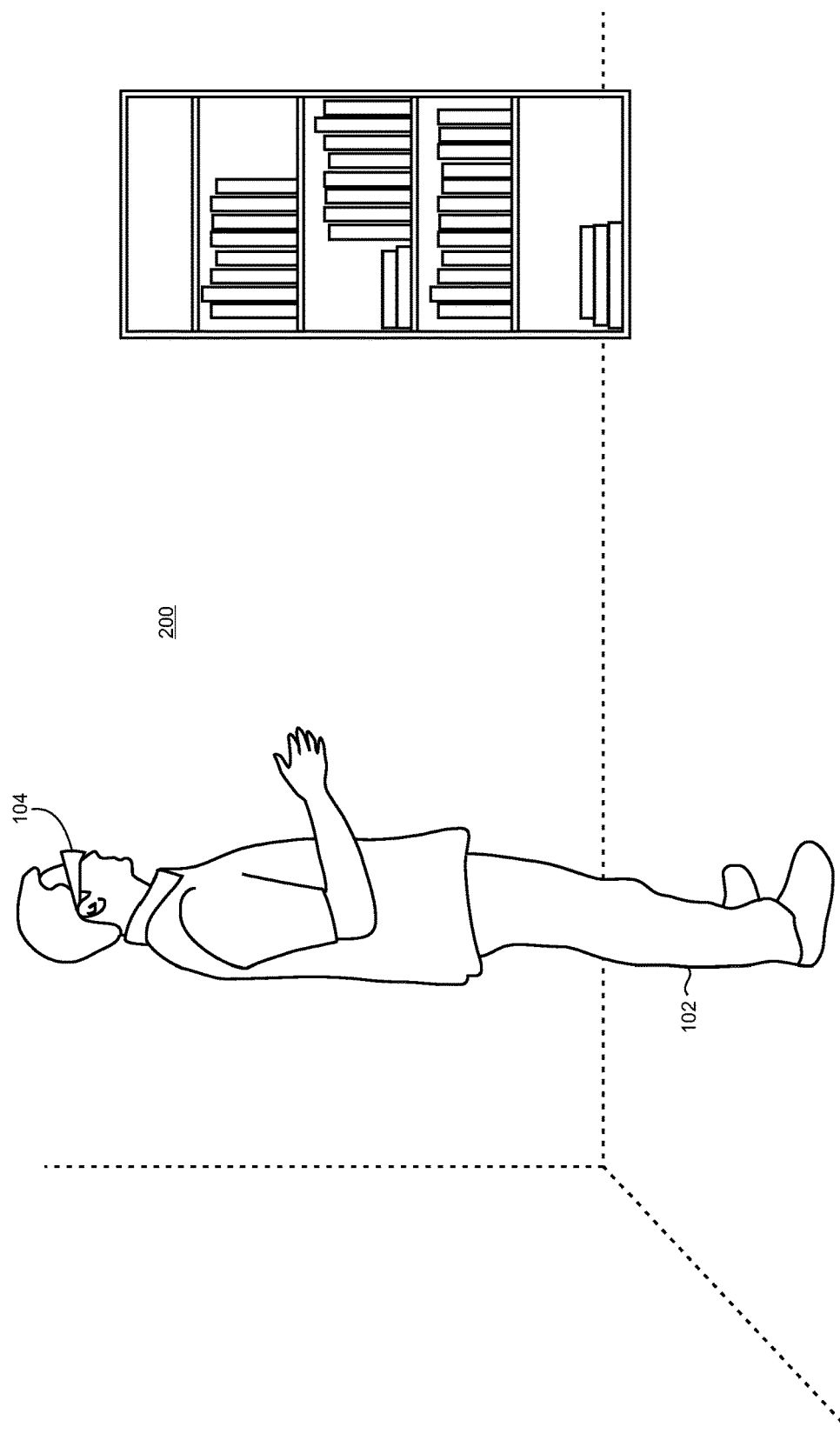
FIG. 2 shows an illustrative real world environment in which a user of an HMD device is located.

Users can typically explore, navigate, and move within a virtual reality environment rendered by an HMD device by moving (e.g., through some form of locomotion) within a corresponding real world, physical environment. In an illustrative example, as shown in FIG. 1, a user 102 can employ an HMD device 104 to experience a virtual reality environment 100 that is rendered visually in three dimensions (3D) and may include audio and/or tactile/haptic sensations in some implementations. In this particular non-limiting example, an application executing on the HMD device 104 supports a virtual reality environment 100 that includes city streets with various buildings, stores, etc. As the user changes the position or orientation of his head and/or moves within the physical real world environment 200 shown in FIG. 2, his view of the virtual reality environment 100 can change. The field of view (represented by the dashed area 110 in FIG. 1) can be sized and shaped and other characteristics of the device can be controlled to make the HMD device experience visually immersive to provide the user with a strong sense of presence in the virtual world. While a virtual reality environment is shown and described herein, the present gaze-based object placement can also be applied to mixed reality environments and scenarios.

During the course of a given user experience with the HMD device 104, various new virtual objects can be introduced into the virtual reality environment. Any of a variety of objects may be introduced including those that may be integral to the experience such as an avatar, terrain, markers, flags, buildings, etc., or those that may be used to enhance or control an experience such as interactive elements including menus, widgets, notifications, etc. that may be used to facilitate a given user interface or user experience supported on the HMD device.

Figure 3:
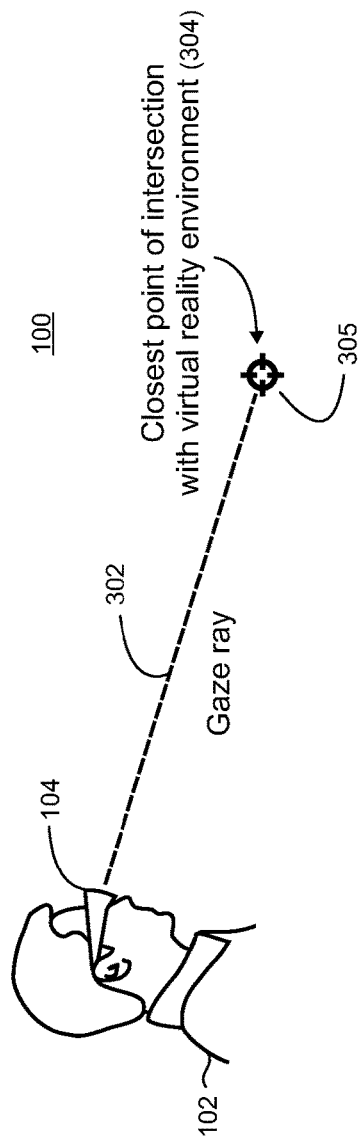
FIG. 3 shows an illustrative gaze ray that is projected from a view position of the HMD device which intersects with a point in the virtual world.
Figure 4:
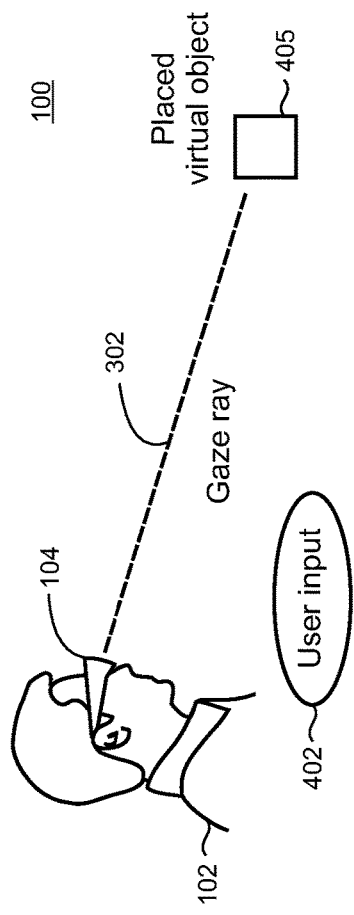
FIG. 4 shows a virtual object being placed at the point of intersection in response to a user input.

As shown in FIG. 3, the HMD device user's view position and/or gaze direction may be utilized to place virtual objects within the virtual world rendered on the HMD display. A gaze ray 302 is projected from the view position of the HMD device 104. The view position originates between the eyes of the user 102 and the ray 302 points in the forward direction as shown. The ray is cast into the virtual reality environment 100 and its closest point of intersection 304 with the virtual reality environment 100 is determined A cursor 305, or other suitable indicator, is typically displayed at the point of intersection. As shown in FIG. 4, when the HMD device 104 receives an input 402 from the user, the device can place a virtual object 405 at the intersection point. The user input 402 can vary by implementation and may include, for example, a sensed gesture, a voice command or language input, a manipulation of a physical or virtual control that is supported by the HMD device, and the like.

In some implementations, the gaze ray may be projected so that the cursor can be rendered at some arbitrary point within the field of view 110. For example, the cursor can be located at a fixed position at or near the center of the field of view in typical scenarios. Because the field of view and view position are typically determined by tracking the position and orientation of the user's head (as described in more detail below) the user can position the cursor onto an object of interest within the virtual world using head movement alone to adjust the field of view.

In alternative implementations, the HMD device may be configured to project the gaze ray in a way that enables the cursor to be rendered at different points within a given field of view according to the position of the user's eyes. Eye position may be detected, for example, using inward facing sensors that may be incorporated into the HMD device 104. Such eye position detection is referred to as gaze tracking and is described in more detail below. Thus, the user can position the cursor in these alternative implementations by using combinations of head and eye movement. For example, the user may use head movement to locate a virtual object of interest within the field of view and then use eye movement to position the cursor on the object.

The HMD device can also be configured in some cases to provide an option to the user to select between fixed and variable cursor positioning, for example by respectively disabling and enabling eye tracking. For example, a fixed cursor relative to the field of view may suit some usage scenarios where head movement alone provides an effective way to position the cursor. In other usage scenarios, a combination of head and eye movement may be more beneficial. In general, utilization of either fixed or variable cursor positioning can enable virtual objects to be placed into the virtual world with a high degree of precision.

Figure 5:
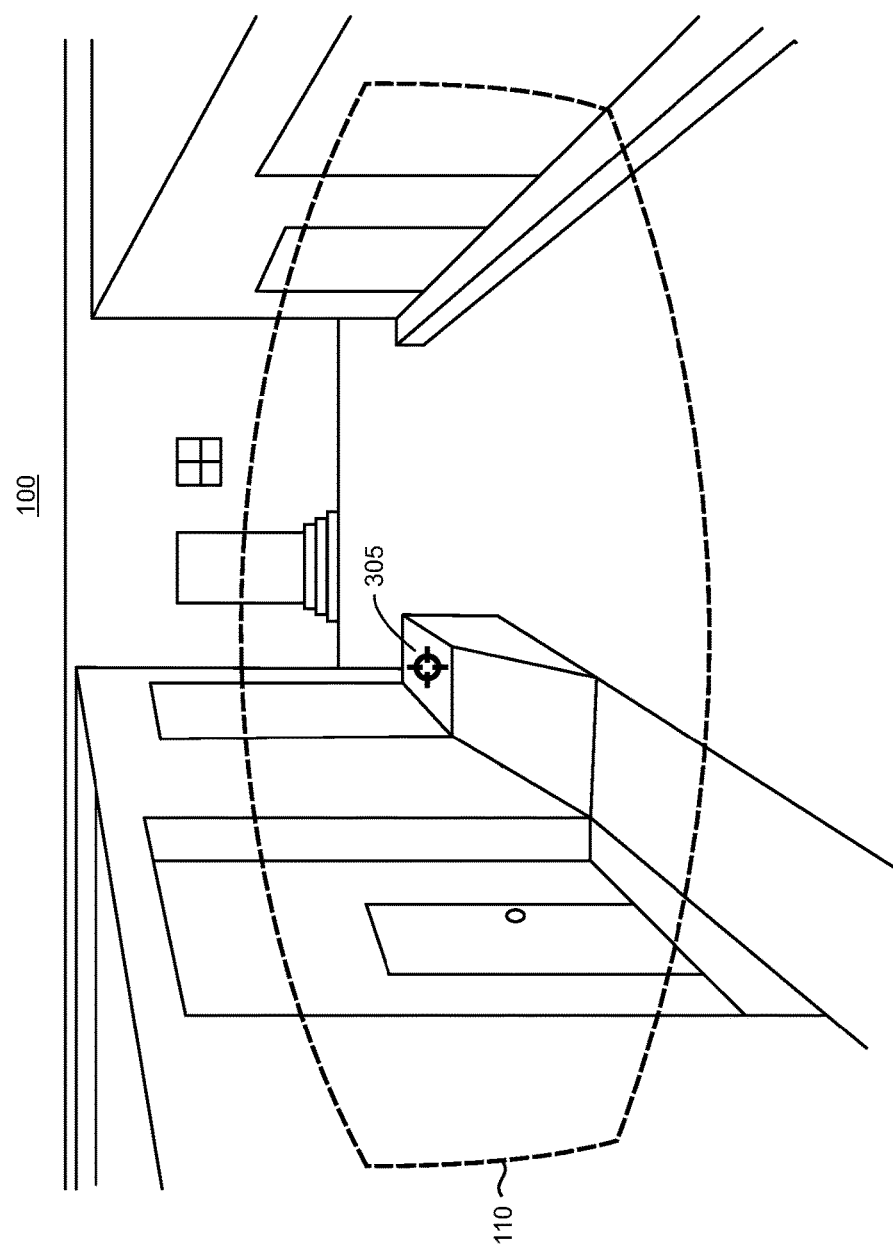
FIG. 5 shows a cursor rendered at the point of intersection of the projected gaze ray in a virtual reality environment within the field of view of the HMD device user.
Figure 6:
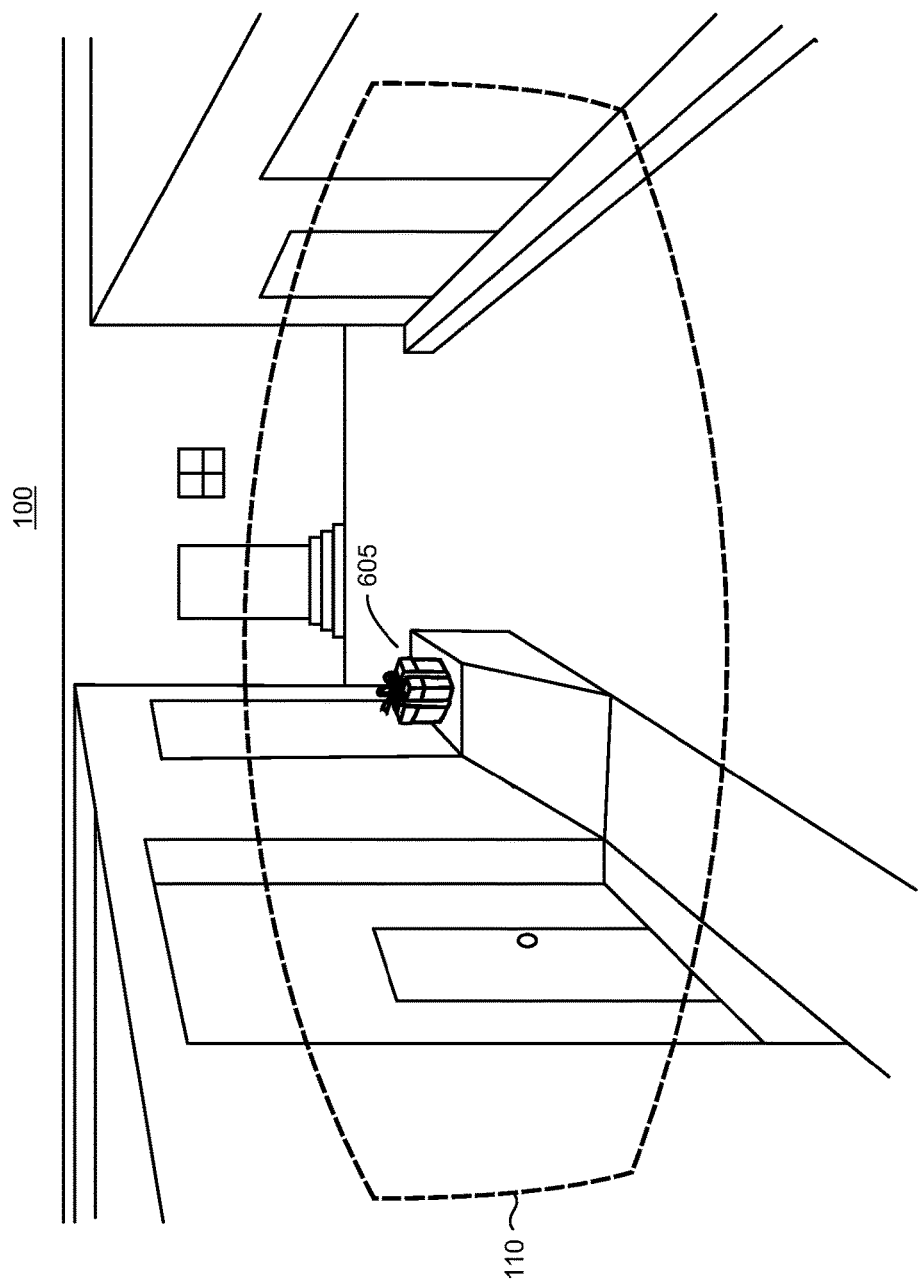
FIG. 6 shows an illustrative virtual object placed at the point of intersection of the projected gaze ray with the virtual reality environment.

FIG. 5 shows the cursor 305 rendered at the point of intersection of a projected gaze ray in a virtual reality environment 100 within the field of view 110 of the HMD device user (the user is not shown for sake of clarity in exposition). Typically, the cursor is dynamically rendered in 3D on the HMD display using a size that is proportional to the cursor's distance from the user in the virtual world (i.e., it is bigger when closer and smaller when farther away). FIG. 6 shows an illustrative virtual object 605 placed at the point of intersection of the projected gaze ray with the virtual reality environment in response to a user input such as a gesture, voice command, or button press. The virtual object 605 is intended to be illustrative and rendered virtual objects can vary from what is shown in size, shape, and location in the field of view.

Figure 7:
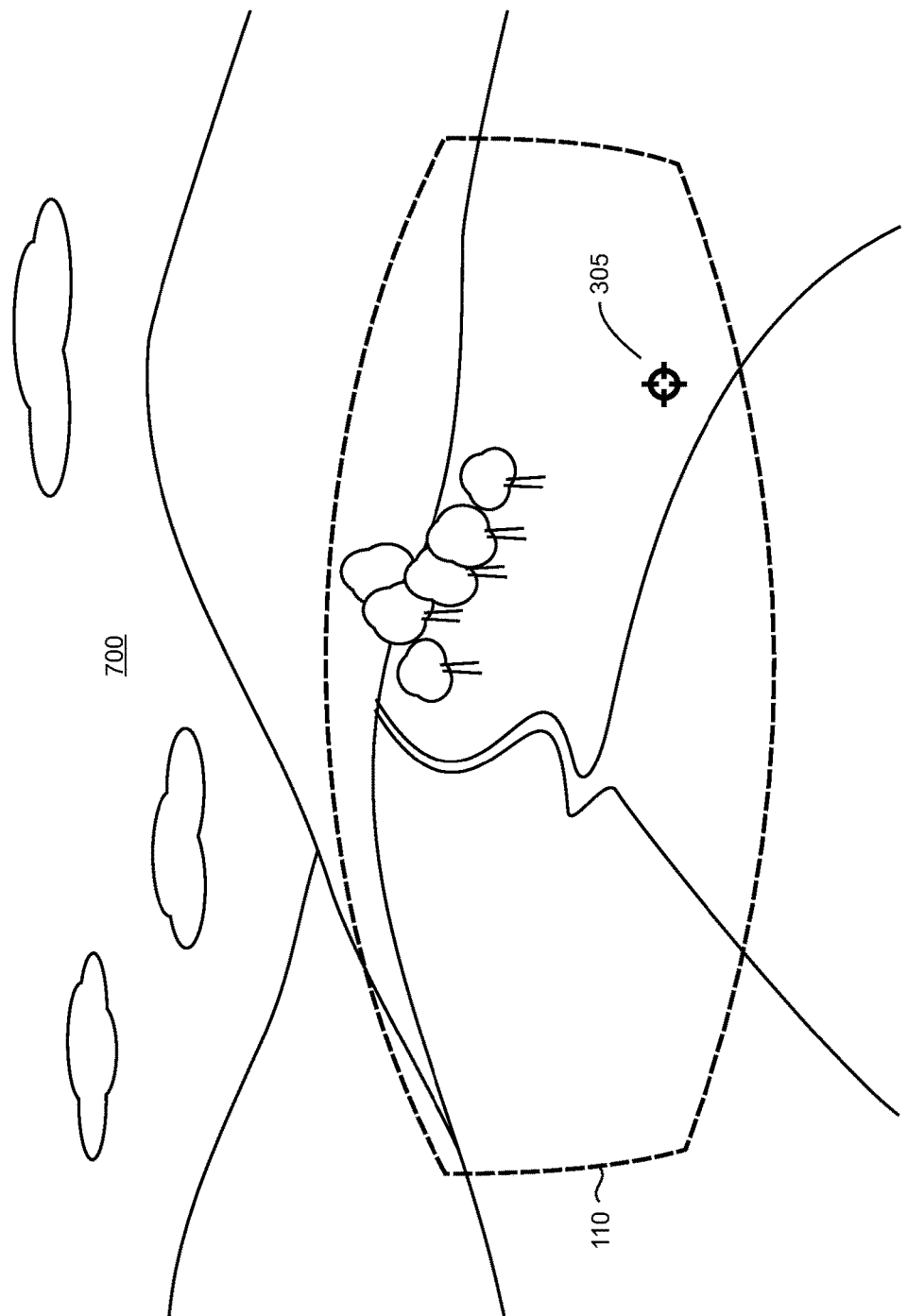
FIG. 7 shows a cursor rendered at the point of intersection of the projected gaze ray in a virtual reality environment within the field of view of the HMD device user.
Figure 8:
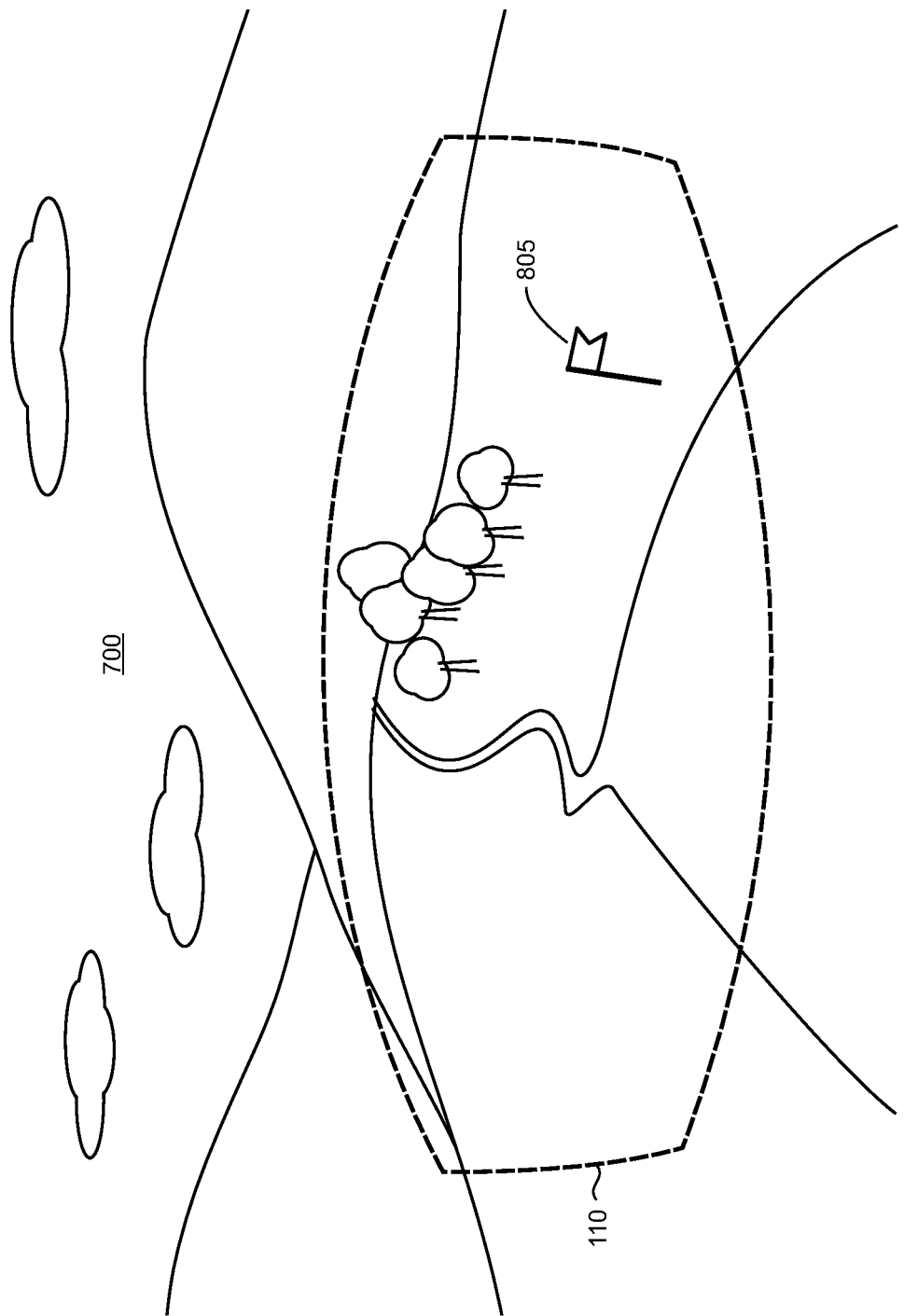
FIG. 8 shows an illustrative virtual object placed at the point of intersection of the projected gaze ray with the virtual reality environment.

FIG. 7 shows another illustrative example of a cursor 305 being rendered at the point of intersection between the projected ray and a virtual reality environment 700 which includes an outdoor landscape with rolling, undulating, and hilly terrain. FIG. 8 shows an exemplary virtual object—a flag 805—that is placed at the point of intersection.

In typical implementations, the field of view 110 for the HMD device 104 can be relatively limited. Accordingly, there is potential for virtual objects that are being introduced into the virtual reality environment 700 to not fit into the user's field of view or to be clipped at an edge of the field of view. This may occur when the user interacts, for example, with relatively large virtual objects which may cause discomfort for the user and/or reduce the quality of the user experience. In other situations, a given virtual object may extend from the point of intersection in manner that causes clipping against an edge of the field of view and/or the user experience may be more effective when the virtual object is more centrally placed within the field of view.

Figure 9:
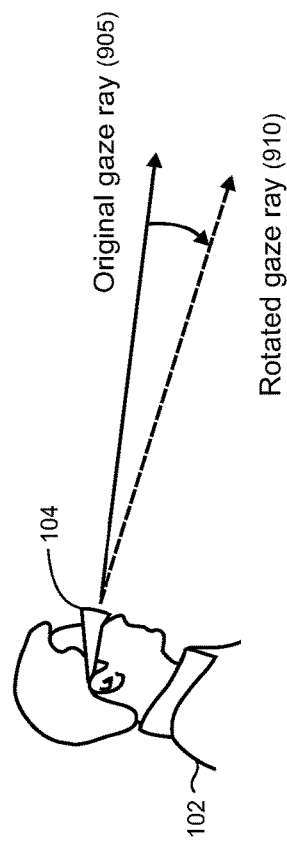
FIG. 9 shows an illustrative projected gaze ray being rotated downward.
Figure 10:
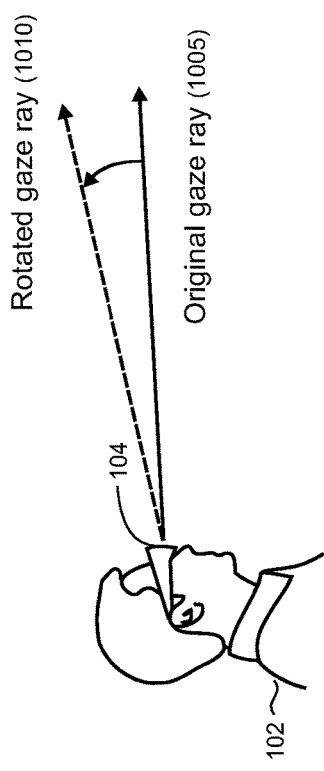
FIG. 10 shows an illustrative projected gaze ray being rotated upward.

Accordingly, in some implementations, the HMD device 104 may be configured to rotate the gaze ray from the view position from the original projection. Such rotation can generally be performed in any direction (e.g., left, right, up, down, or combinations thereof) to suit a given use case and the angle of rotation can vary. As illustratively shown in FIG. 9, the rotation may be performed downward (the original gaze ray is indicated by reference numeral 905 and the rotated gaze ray is indicated by reference numeral 910 in FIG. 9). As illustratively shown in FIG. 10, the rotation may be performed upward (the original gaze ray is indicated by reference numeral 1005 and the rotated gaze ray is indicated by reference numeral 1010 in FIG. 10).

Figure 11:
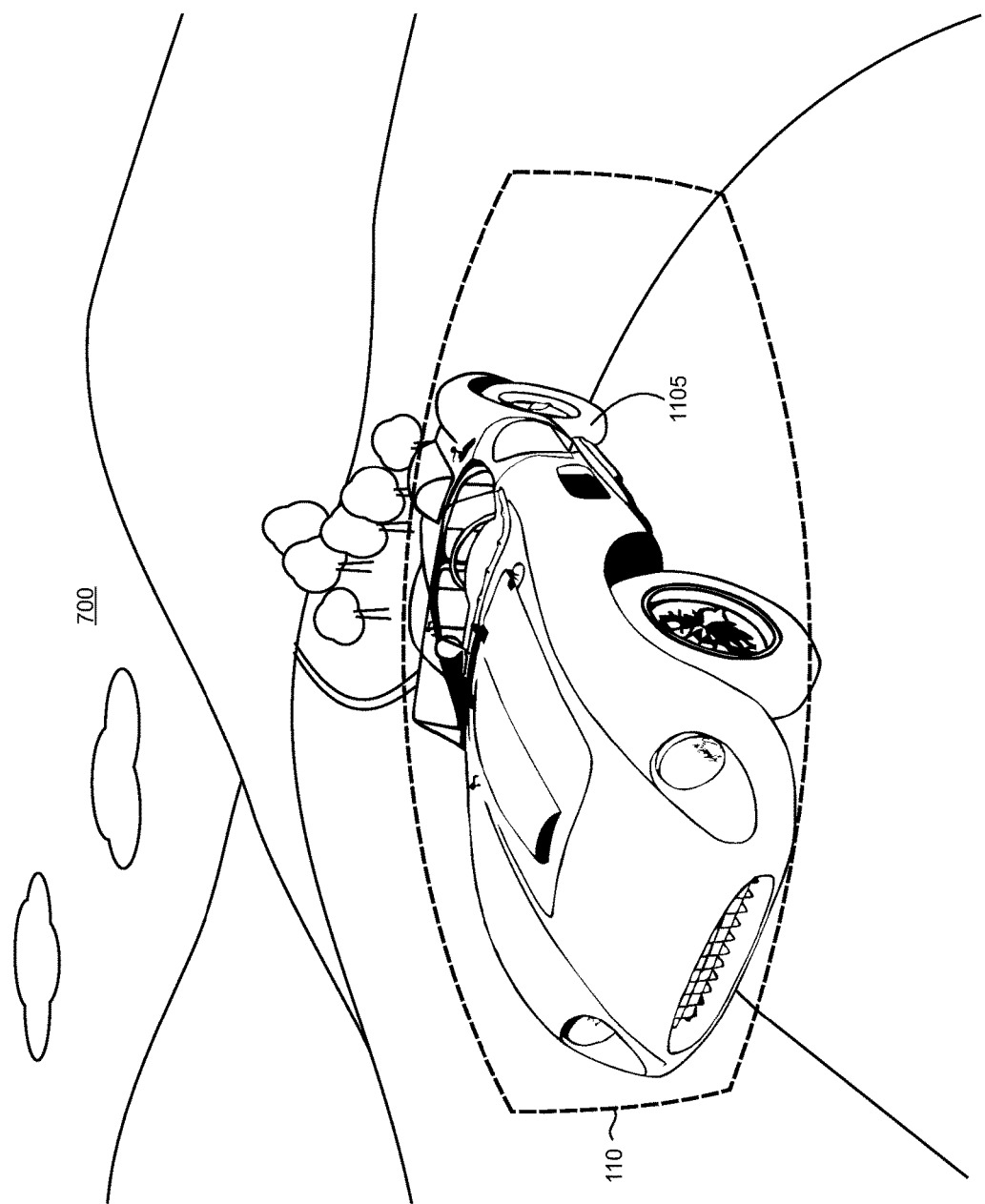
FIG. 11 shows an illustrative large virtual object that is clipped by the user's field of view.
Figure 12:
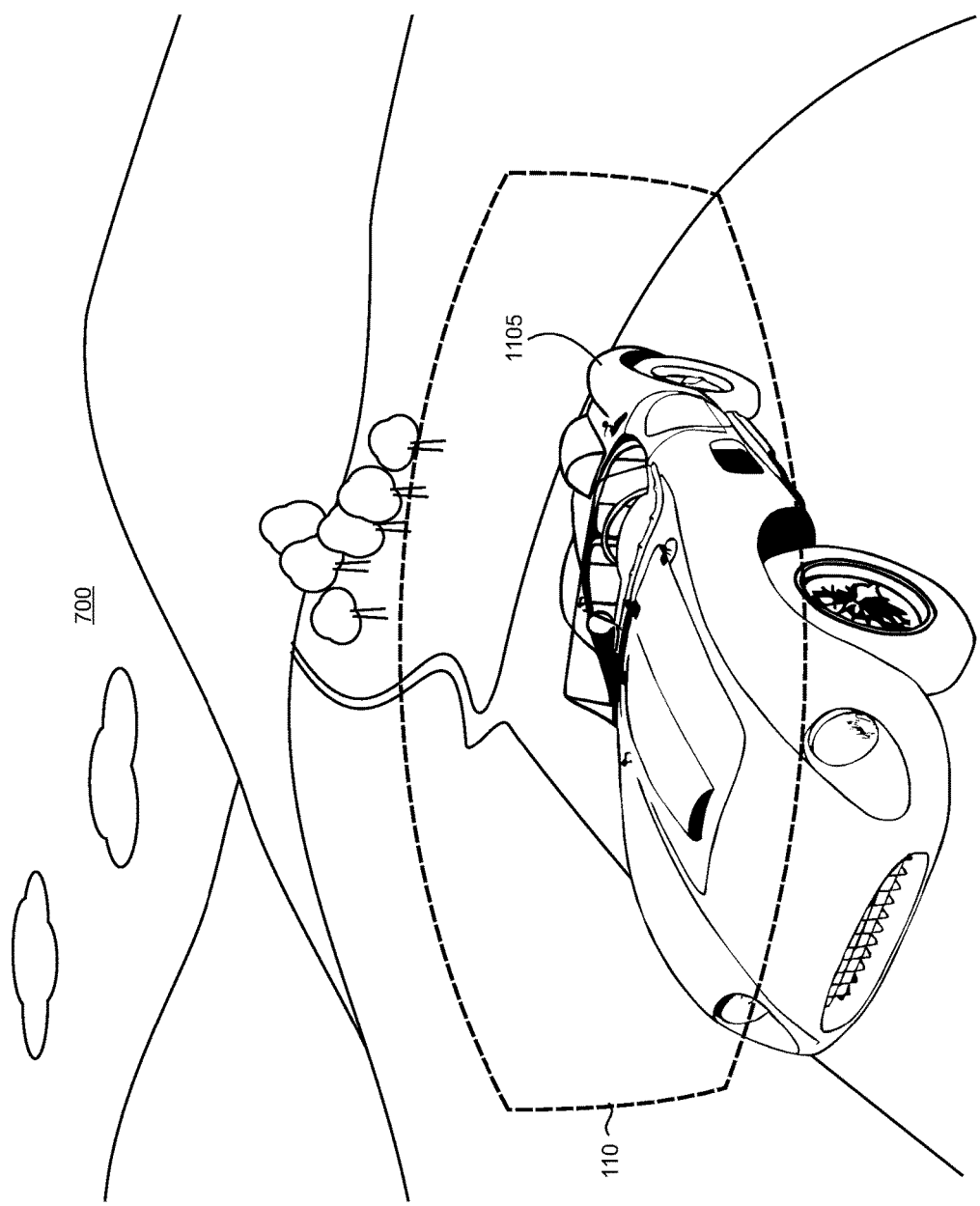
FIG. 12 shows a large virtual object that is positioned in the virtual world using a rotated gaze ray so that the object is not clipped against the top edge of the field of view.

FIG. 11 shows an illustrative virtual object 1105 that is relatively large and is clipped against the top of the field of view 110 when positioned at the intersection of the original gaze ray 905 (FIG. 9) with the virtual reality environment 700. By comparison, FIG. 12 shows the virtual object 1105 when positioned at the intersection of the downward rotated gaze ray 910 with the virtual reality environment 700. In typical implementations, the projected ray is rotated downward sufficiently to be cast through the bottom portion of the field of view 110. As shown, there is much more room in the field of view and the virtual object 1105 is no longer clipped against the top edge of the field of view 110.

Figure 13:
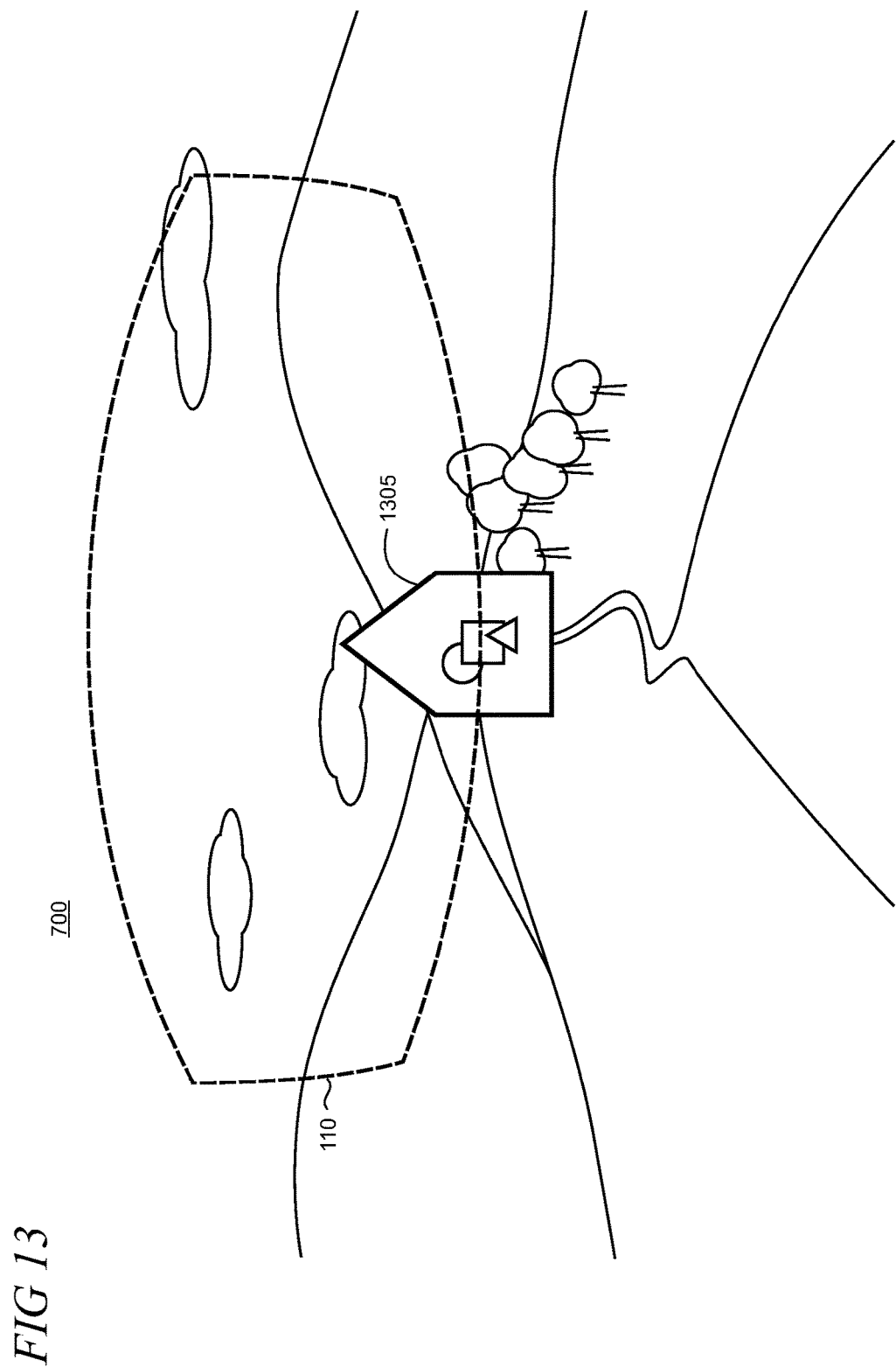
FIG. 13 shows an illustrative virtual object that is clipped by the user's field of view.
Figure 14:
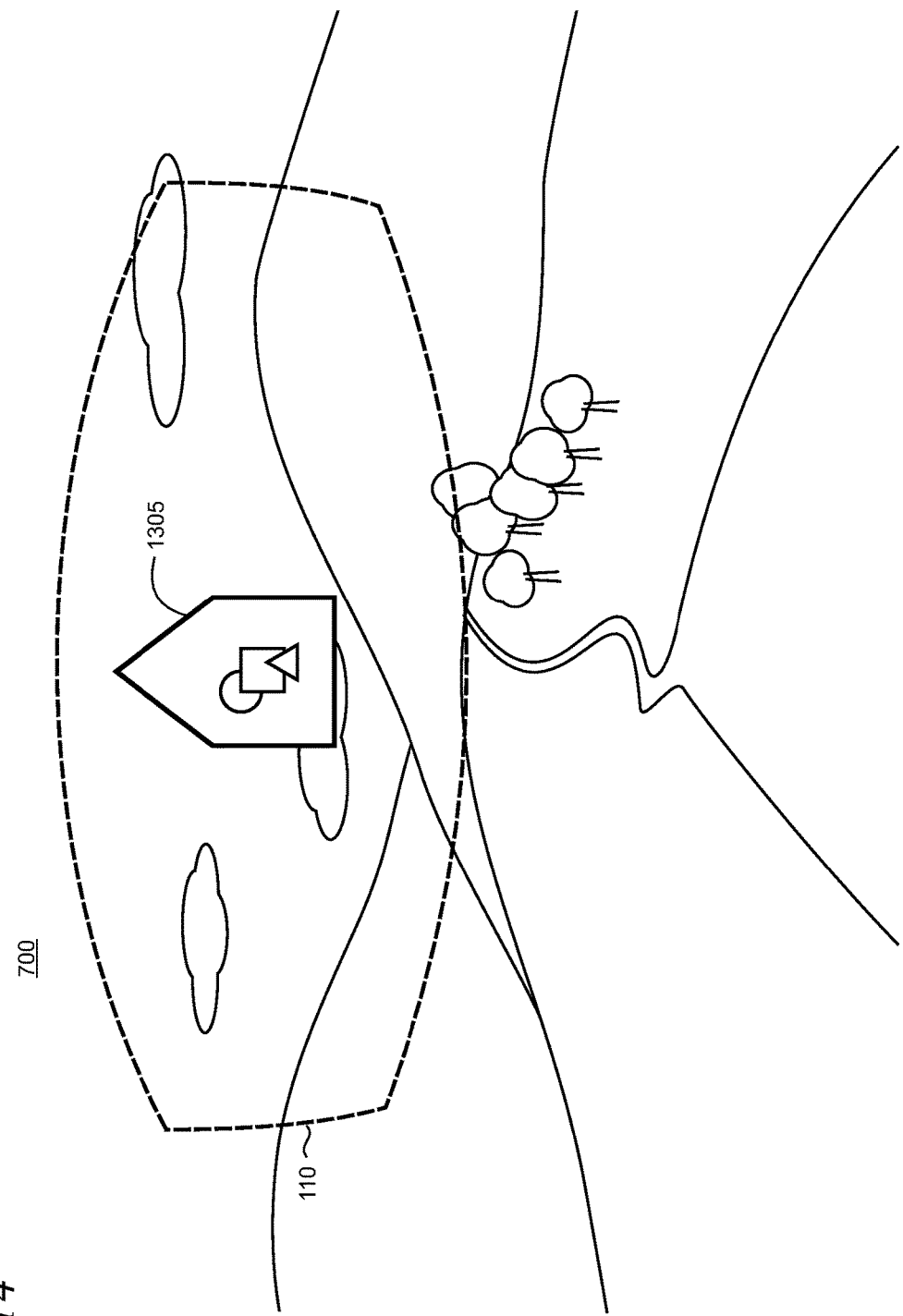
FIG. 14 shows a virtual object that is positioned in the virtual world using a rotated gaze ray so that the object is not clipped against the bottom edge of the field of view and the object is more centrally located within the field of view.

FIG. 13 shows an illustrative virtual object 1305 arranged as a banner that hangs down from the point of intersection of the original gaze ray 1005 (FIG. 10) with a cloud in the virtual reality environment 700. As shown, the object 1305 is clipped at the bottom edge of the field of view 110 and portions of the content on the banner (as represented by the geometric shapes) are outside the field of view. The content is also not as effectively presented when viewed at the bottom of the field of view and may also cause user discomfort in some cases. By comparison, FIG. 14 shows the virtual object 1305 when positioned at the intersection of an upward rotated gaze ray 1010 with the virtual reality environment 700. As shown, the virtual object is no longer clipped against the bottom edge of the field of view 110 and the banner content is more centrally located in the field of view which may increase the effectiveness of the user experience and increase user comfort in some situations.

The HMD device 104 is configured to obtain surface reconstruction data 1500, as shown in FIG. 15, by using an integrated sensor package 1505 to sense the user's position within the physical environment 200. The sensor package, as described in more detail below, can include a depth sensor or depth-sensing camera system. In alternative implementations, depth data can be derived using suitable stereoscopic image analysis techniques.

As shown in FIG. 16, the sensor package 1505 can support various functionalities including surface reconstruction 1610. Surface reconstruction may be utilized, for example, for head tracking to determine the 3D (three-dimensional) position and orientation 1615 of the user's head within the physical real world environment 200 including head pose so that a view position of the virtual world can be determined The sensor package can also support gaze tracking 1620 to ascertain a direction of the user's gaze 1625 which may be used along with the head position and orientation data. The HMD device 104 may further be configured to expose a user interface (UI) 1630 that can display system messages, prompts, and the like as well as expose controls that the user may manipulate. The controls can be virtual or physical in some cases. The UI 1630 may also be configured to operate with sensed gestures and voice using, for example, voice commands or natural language.

Figure 17:
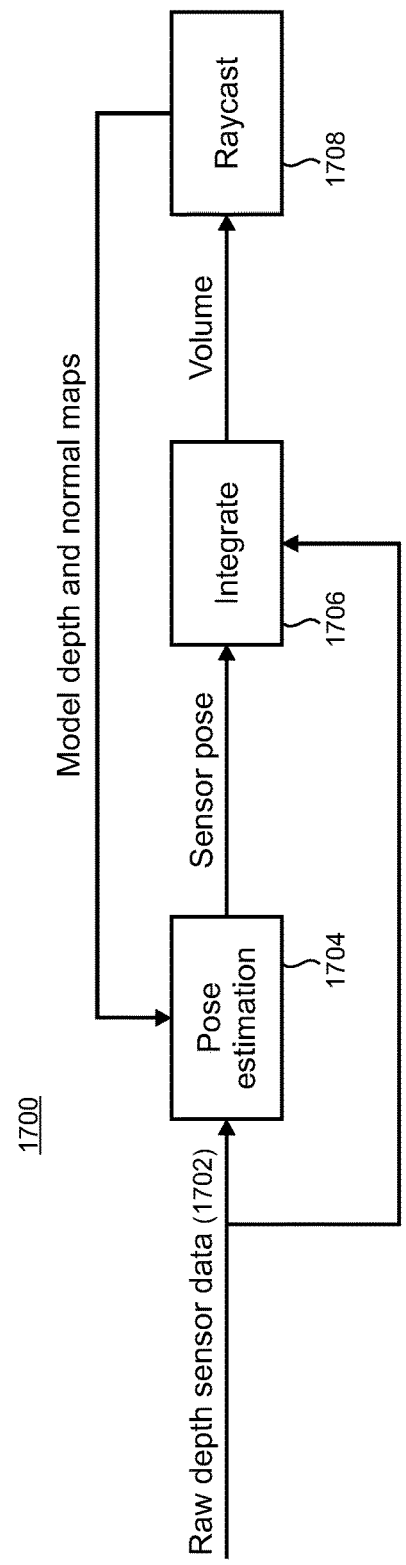
FIG. 17 shows a block diagram of an illustrative surface reconstruction pipeline.

FIG. 17 shows an illustrative surface reconstruction data pipeline 1700 for obtaining surface reconstruction data for the real world environment 200. It is emphasized that the disclosed technique is illustrative and that other techniques and methodologies may be utilized depending on the requirements of a particular implementation. Raw depth sensor data 1702 is input into a 3D (three-dimensional) pose estimate of the sensor (block 1704). Sensor pose tracking can be achieved, for example, using ICP (iterative closest point) alignment between the predicted surface and current sensor measurement. Each depth measurement of the sensor can be integrated (block 1706) into a volumetric representation using, for example, surfaces encoded as a signed distance field (SDF). Using a loop, the SDF is raycast (block 1708) into the estimated frame to provide a dense surface prediction to which the depth map is aligned. Thus, when the user 102 looks around the virtual world, surface reconstruction data associated with the real world environment 200 can be collected and analyzed to determine the user's head position and orientation.

Figure 18:
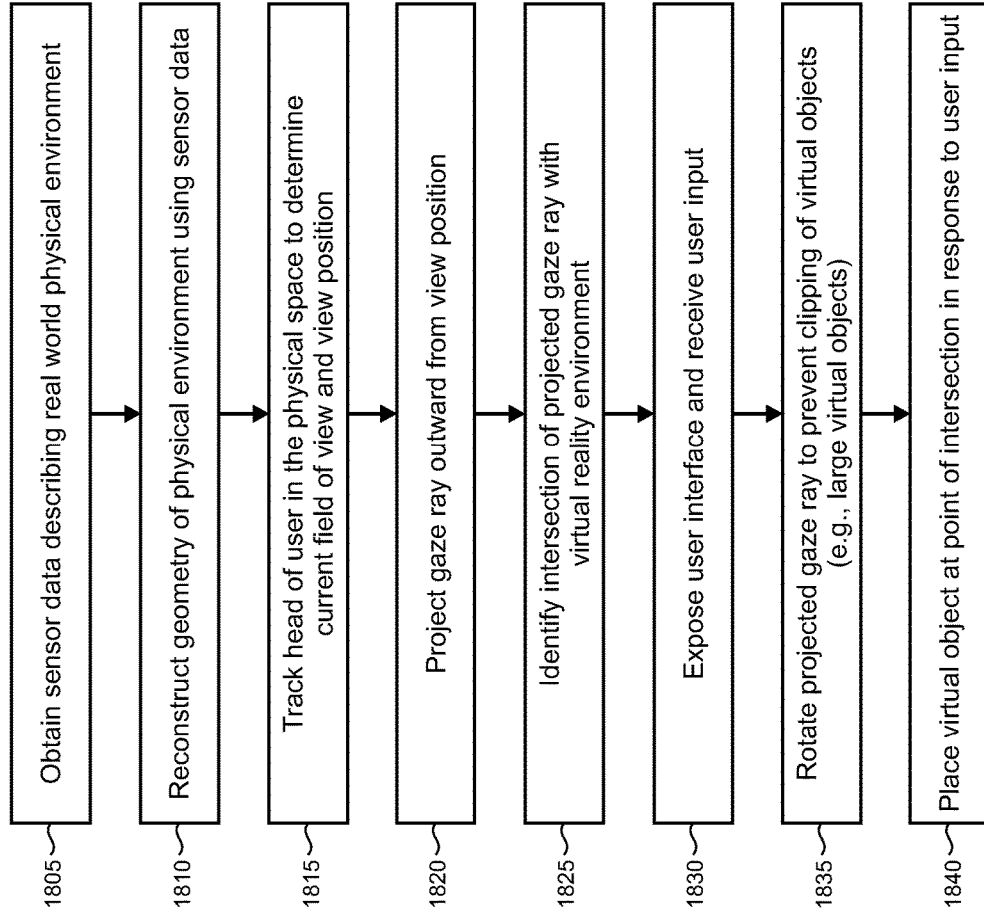
FIGS. 18, 19, and 20 are flowcharts of illustrative methods that may be performed using an HMD device.
Figure 19:
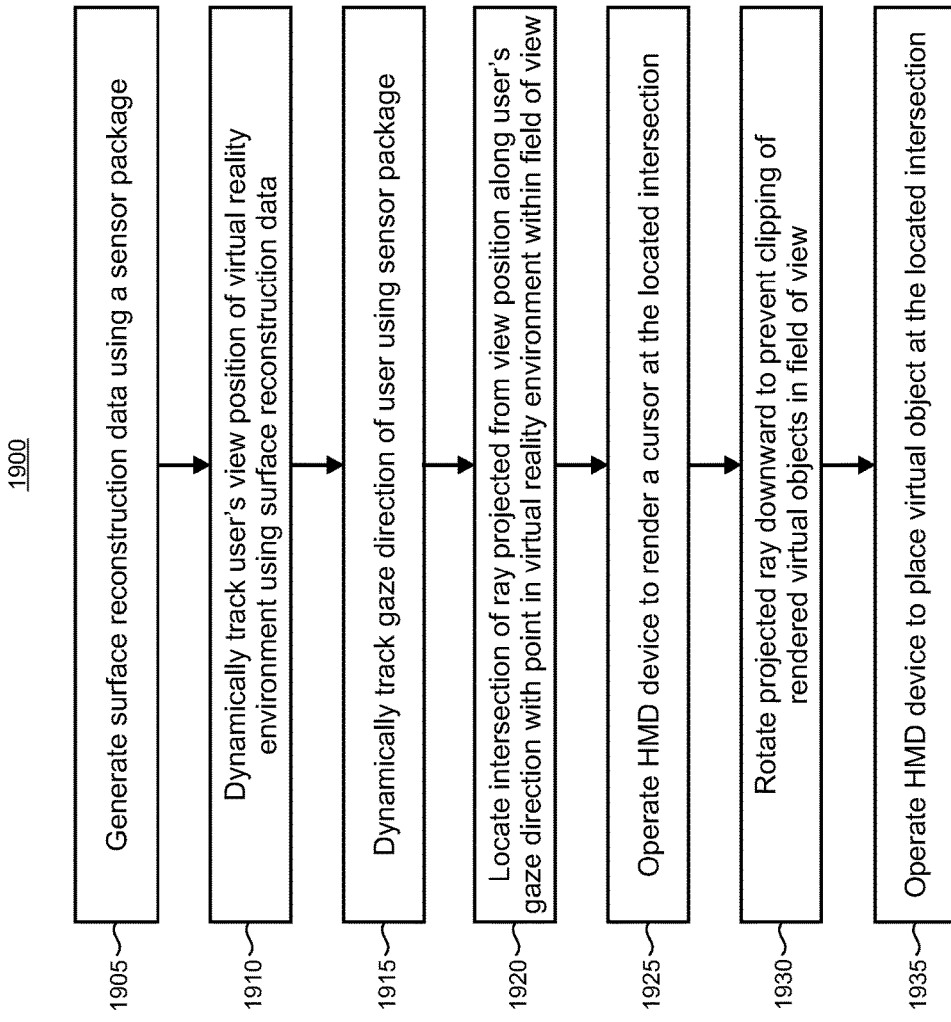
Figure 20:
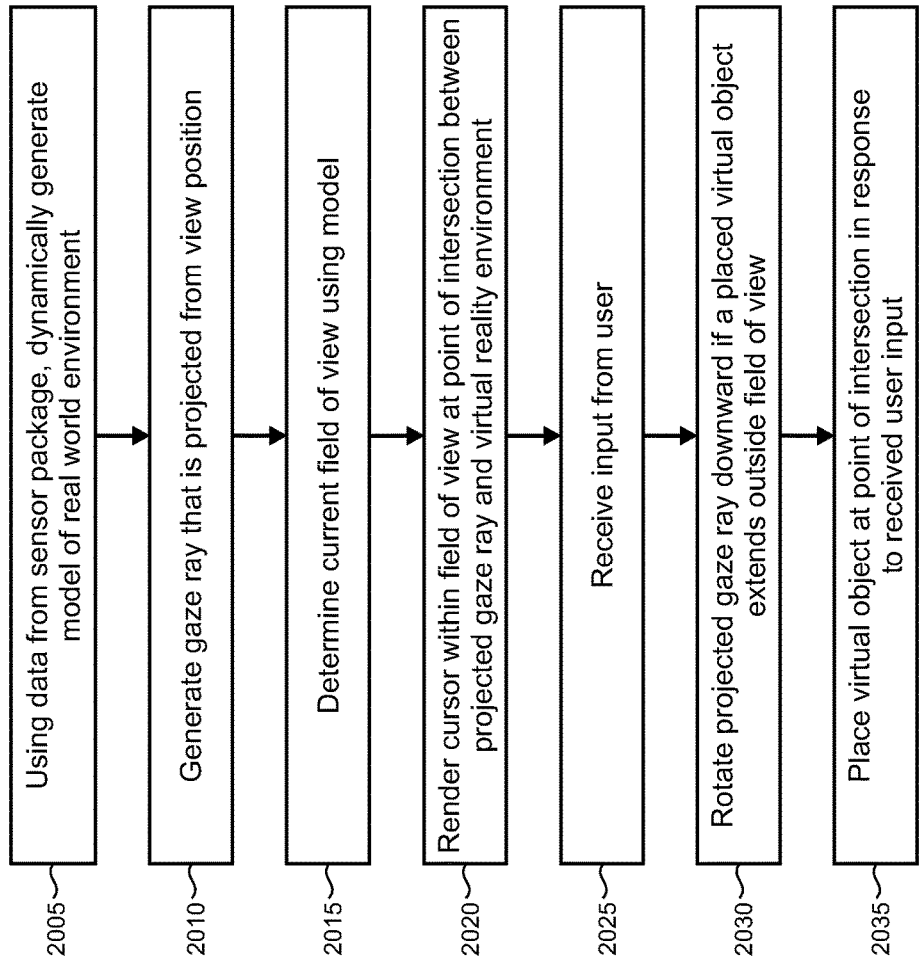

FIGS. 18, 19, and 20 are flowcharts of illustrative methods. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 1800 shown in FIG. 18 may be performed by an HMD device that supports rendering of a virtual reality environment. In step 1805, sensor data is obtained which describes a real world physical environment that adjoins a user of an HMD device. The sensor data can include, for example, depth data using a depth sensor that is integrated into the HMD device or be obtained from an external sensor or source. Depth-from-stereo imaging analyses may also be used to create depth data. In step 1810, the sensor data is used to reconstruct a geometry of the physical environment, for example, using surface reconstruction.

In step 1815, the reconstructed geometry of the physical environment is used to perform tracking of the user's head to determine a current field of view and view position of the virtual reality environment. In step 1820, a gaze ray is projected outward from the view position along a direction of the user's gaze. Gaze detection may also be implemented, for example, using inward facings sensors that are incorporated into the sensor package 1505 (FIG. 15).

In step 1825, an intersection is identified between the projected gaze ray and the virtual reality environment. In step 1830, the HMD device exposes a user interface and user input is received. The user interface can be configured according to the needs of a given implementation, and may include physical or virtual controls that may be manipulated by the user and may support voice and/or gestures in some cases. In step 1835, the projected ray may be rotated downwards in some cases to prevent clipping of some virtual objects (e.g., large virtual objects) along a top edge of the field of view, for example, when the virtual object is so large that it cannot fit within the field of view. In some cases, the rotated projected ray is cast through a bottom portion of the field of view. In step 1840, responsively to the user input, a virtual object can be placed at the point of intersection.

Method 1900 shown in FIG. 19 may be performed by an HMD device having one or more processors, a display for rendering a virtual reality environment using a variable field of view, a sensor package, and one or more memory devices that store computer-readable instructions such as software code that can be utilized to implement the method. In step 1905, surface reconstruction data is generated using the sensor package that is incorporated into the HMD device which may include a depth sensor or camera system. In step 1910, the surface reconstruction data is used to dynamically track the user's view position of the virtual reality environment. Various suitable surface reconstruction techniques may be utilized including that shown in the pipeline in FIG. 17 in which multiple overlapping surfaces are integrated.

In step 1915, the sensor package is used to dynamically track the user's gaze direction, for example using inward facing sensors. In step 1920, an intersection between a ray that is projected from the view position along the user's gaze direction and a point in the virtual reality environment within the field of view is located. In step 1925, the HMD device is operated to render a cursor at the located intersection. The rendering is typically performed dynamically so that as the user moves and the field of view and gaze direction change, the cursor position in the virtual reality environment is updated. In some cases in which a placed virtual object would be clipped in the field of view, the projected ray can be rotated downward, in step 1930, so that the object is not clipped by an upper edge of the current field of view when the object is placed at the intersection of the rotated ray and the virtual reality environment. In step 1935, the HMD device is operated to place a virtual object at the located intersection. In typical implementations, the placement is performed in response to user input to a UI that is exposed by the HMD device.

Method 2000 in FIG. 20 may be performed by instructions stored on an HMD device operating in a real world environment and having a display that renders a virtual reality environment. In step 2005, a surface reconstruction model of the real world environment is dynamically generated using data from a sensor package onboard the HMD device. The model can be updated, for example, on a frame-by-frame or other suitable basis, as the user moves within the real world environment. In step 2010, the data from the sensor package is utilized to generate a gaze ray that is projected from the user's view position along a direction of the user's gaze.

The current surface reconstruction model is utilized to determine the user's current field of view of the virtual reality environment in step 2015. In step 2020, a cursor is rendered at a point of intersection between the projected gaze ray and the virtual reality environment. In step 2025, a user input is received, for example at a UI exposed by the HMD device. In step 2030, the projected gaze ray can be rotated downward if a placed virtual object extends outside the field of view. In some implementations, the degree of rotation is sufficient to enable the virtual object to be placed in a manner that allows space in the field of view above the object to be unobstructed. In step 2035, a virtual object is placed at the point of intersection in response to the received user input.

Figure 21:
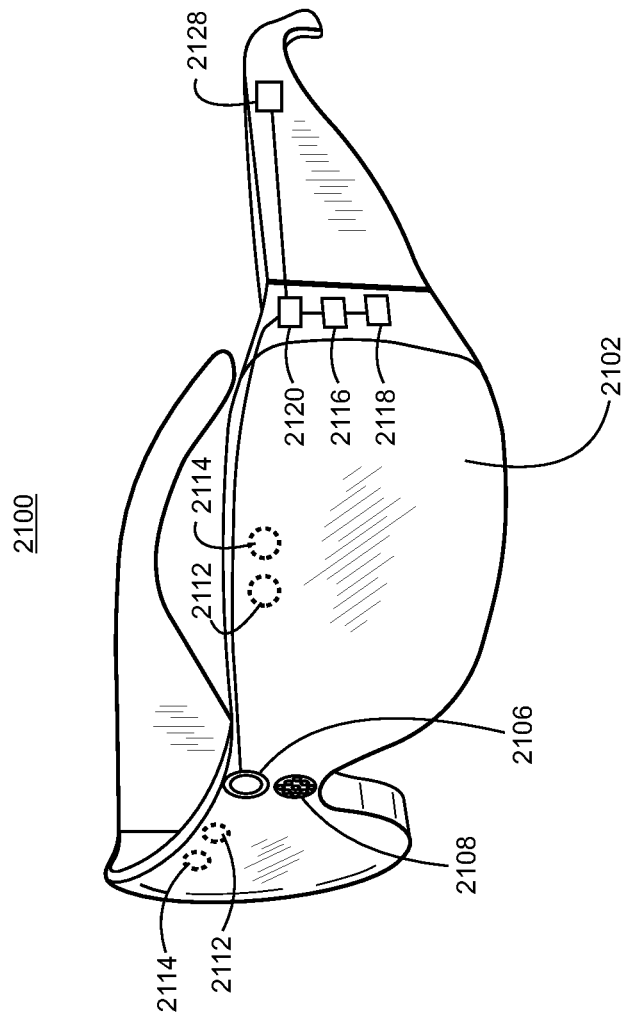
FIG. 21 is a pictorial view of an illustrative example of a virtual reality HMD device.
Figure 22:
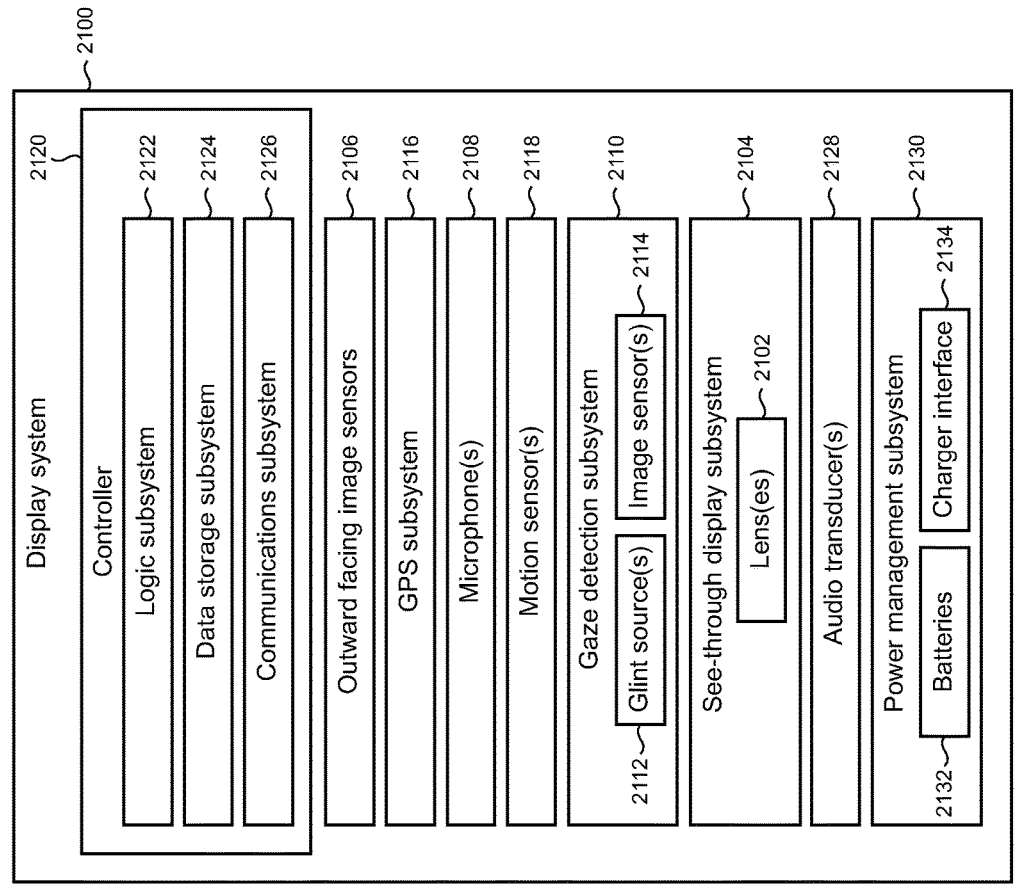
FIG. 22 shows a functional block diagram of an illustrative example of a virtual reality HMD device.
Figure 23:
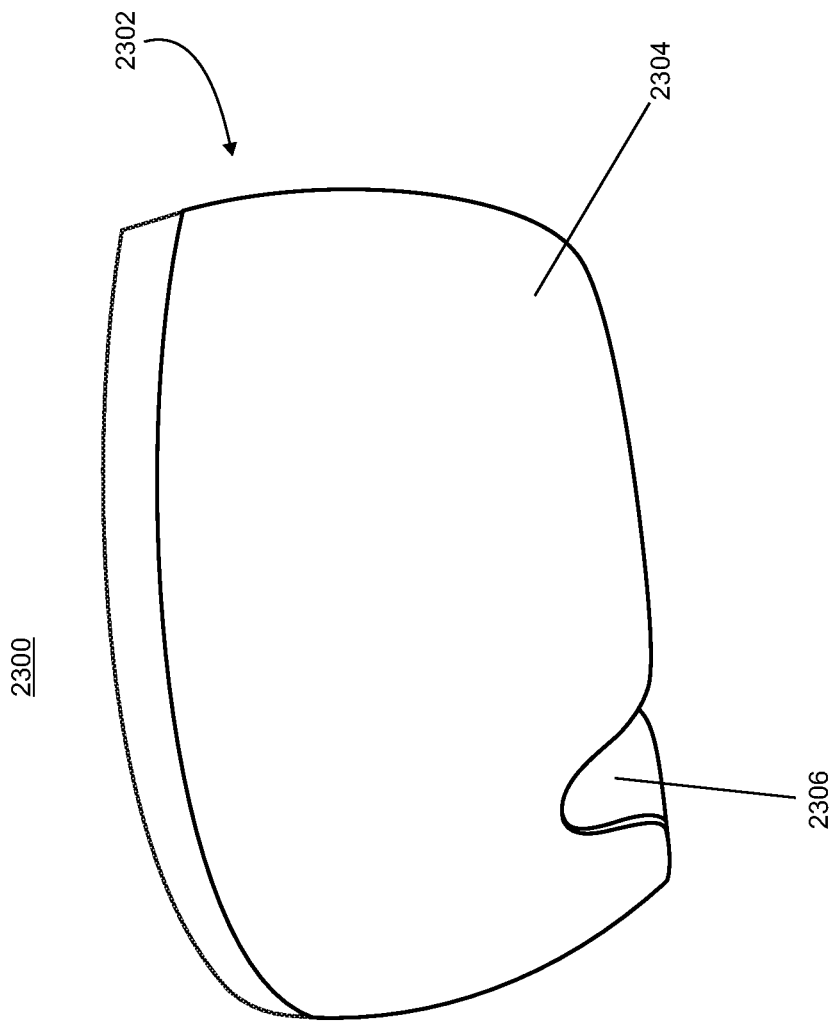
FIGS. 23 and 24 are pictorial front views of an illustrative sealed visor that may be used as a component of a virtual reality HMD device.
Figure 24:
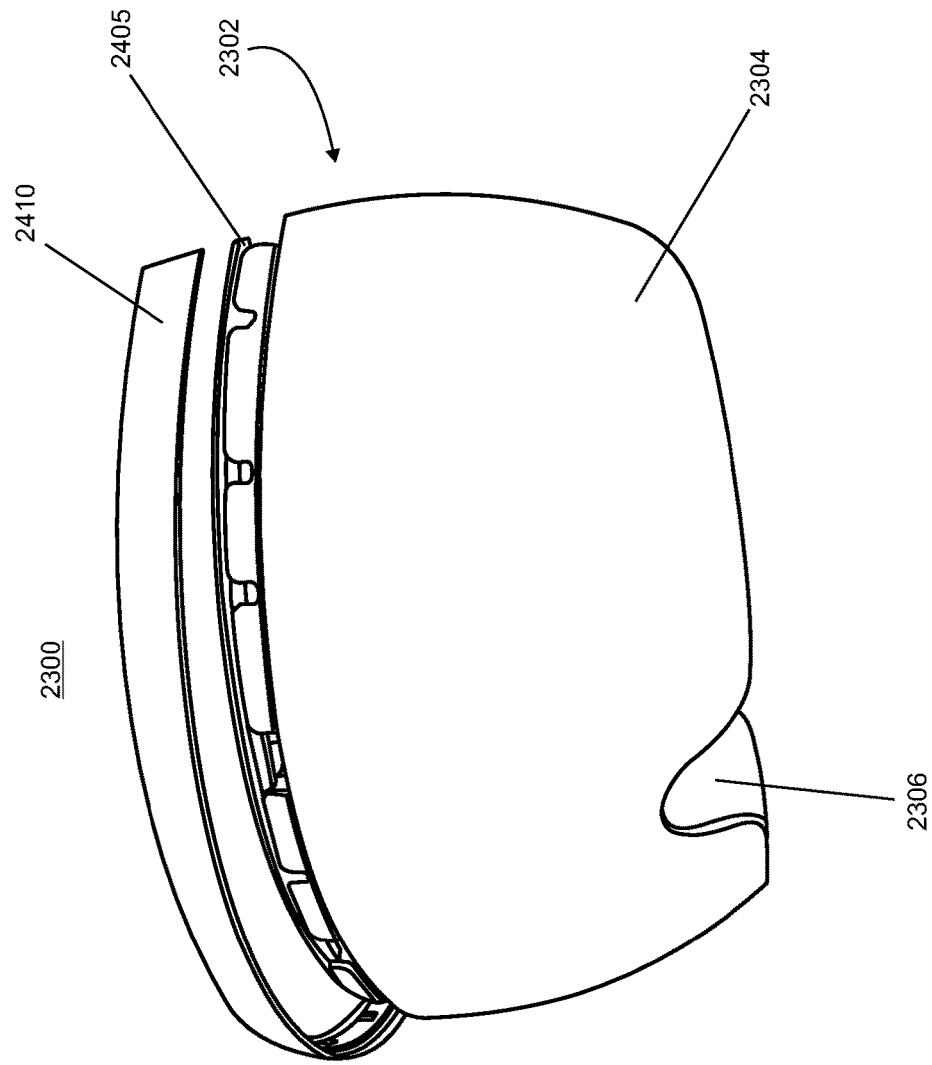

Turning now to various illustrative implementation details, a virtual reality or mixed reality display device according to the present arrangement may take any suitable form, including but not limited to near-eye devices such as the HMD device 104 and/or other portable/mobile devices. FIG. 21 shows one particular illustrative example of a see-through, mixed reality display system 2100, and FIG. 22 shows a functional block diagram of the system 2100. However, it is emphasized that while a see-through display may be used in some implementations, an opaque (i.e., non-see-through) display using a camera-based pass-through or outward facing sensor, for example, may be used in other implementations.

Display system 2100 comprises one or more lenses 2102 that form a part of a see-through display subsystem 2104, such that images may be displayed using lenses 2102 (e.g. using projection onto lenses 2102, one or more waveguide systems incorporated into the lenses 2102, and/or in any other suitable manner). Display system 2100 further comprises one or more outward-facing image sensors 2106 configured to acquire images of a background scene and/or physical environment being viewed by a user, and may include one or more microphones 2108 configured to detect sounds, such as voice commands from a user. Outward-facing image sensors 2106 may include one or more depth sensors and/or one or more two-dimensional image sensors. In alternative arrangements, as noted above, a virtual reality or mixed reality display system, instead of incorporating a see-through display subsystem, may display mixed reality images through a viewfinder mode for an outward-facing image sensor.

The display system 2100 may further include a gaze detection subsystem 2110 configured for detecting a direction of gaze of each eye of a user or a direction or location of focus, as described above. Gaze detection subsystem 2110 may be configured to determine gaze directions of each of a user's eyes in any suitable manner. For example, in the illustrative example shown, a gaze detection subsystem 2110 includes one or more glint sources 2112, such as infrared light sources, that are configured to cause a glint of light to reflect from each eyeball of a user, and one or more image sensors 2114, such as inward-facing sensors, that are configured to capture an image of each eyeball of the user. Changes in the glints from the user's eyeballs and/or a location of a user's pupil, as determined from image data gathered using the image sensor(s) 2114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2110 may have any suitable number and arrangement of light sources and image sensors. In some implementations, the gaze detection subsystem 2110 may be omitted.

The display system 2100 may also include additional sensors. For example, display system 2100 may comprise a global positioning system (GPS) subsystem 2116 to allow a location of the display system 2100 to be determined This may help to identify real world objects, such as buildings, etc. that may be located in the user's adjoining physical environment.

The display system 2100 may further include one or more motion sensors 2118 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 2106. The use of motion data may allow changes in gaze location to be tracked even if image data from outward-facing image sensor(s) 2106 cannot be resolved.

In addition, motion sensors 2118, as well as microphone(s) 2108 and gaze detection subsystem 2110, also may be employed as user input devices, such that a user may interact with the display system 2100 via gestures of the eye, neck and/or head, as well as via verbal commands in some cases. It may be understood that sensors illustrated in FIGS. 21 and 22 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2100 can further include a controller 2120 having a logic subsystem 2122 and a data storage subsystem 2124 in communication with the sensors, gaze detection subsystem 2110, display subsystem 2104, and/or other components through a communications subsystem 2126. The communications subsystem 2126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2124 may include instructions stored thereon that are executable by logic subsystem 2122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2100 is configured with one or more audio transducers 2128 (e.g., speakers, earphones, etc.) so that audio can be utilized as part of an augmented reality experience. A power management subsystem 2130 may include one or more batteries 2132 and/or protection circuit modules (PCMs) and an associated charger interface 2134 and/or remote power interface for supplying power to components in the display system 2100.

It may be appreciated that the depicted display devices 104 and 2100 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 23-27 show an illustrative alternative implementation for a virtual or mixed reality display system 2300 that may be used as a component of an HMD device. In this example, the system 2300 uses a see-through sealed visor 2302 that is configured to protect the internal optics assembly utilized for the see-through display subsystem. The visor 2302 is typically interfaced with other components of the HMD device (not shown) such as head mounting/retention systems and other subsystems including sensors, power management, controllers, etc., as illustratively described in conjunction with FIGS. 21 and 22. Suitable interface elements (not shown) including snaps, bosses, screws and other fasteners, etc. may also be incorporated into the visor 2302.

The visor includes see-through front and rear shields 2304 and 2306 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 2405 as depicted in the partially exploded view in FIG. 24 in which a shield cover 2410 is shown as disassembled from the visor 2302.

The sealed visor 2302 can physically protect sensitive internal components, including an optics display subassembly 2502 (shown in the disassembled view in FIG. 25) when the HMD device is worn and used in operation and during normal handling for cleaning and the like. The visor 2302 can also protect the optics display subassembly 2502 from environmental elements and damage should the HMD device be dropped or bumped, impacted, etc. The optics display subassembly 2502 is mounted within the sealed visor in such a way that the shields do not contact the subassembly when deflected upon drop or impact.

Figure 25:
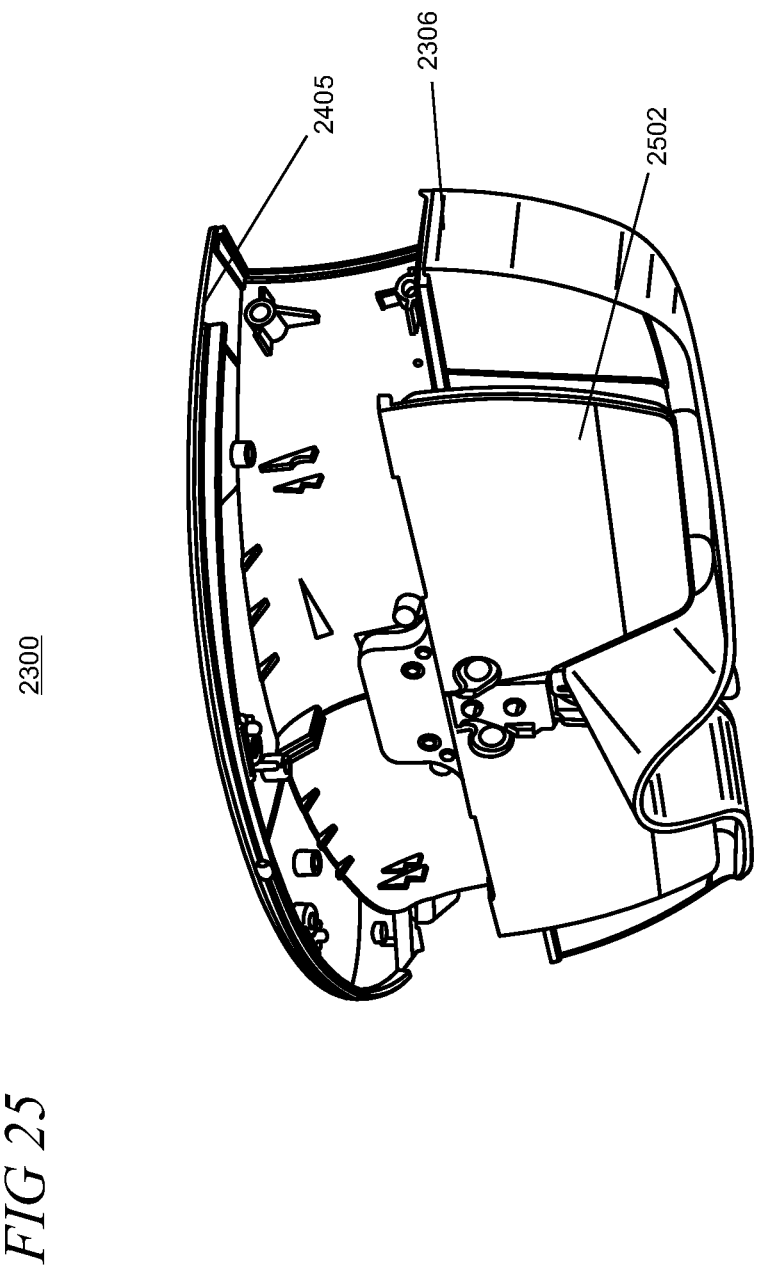
FIG. 25 shows a view of the sealed visor when partially disassembled.
Figure 26:
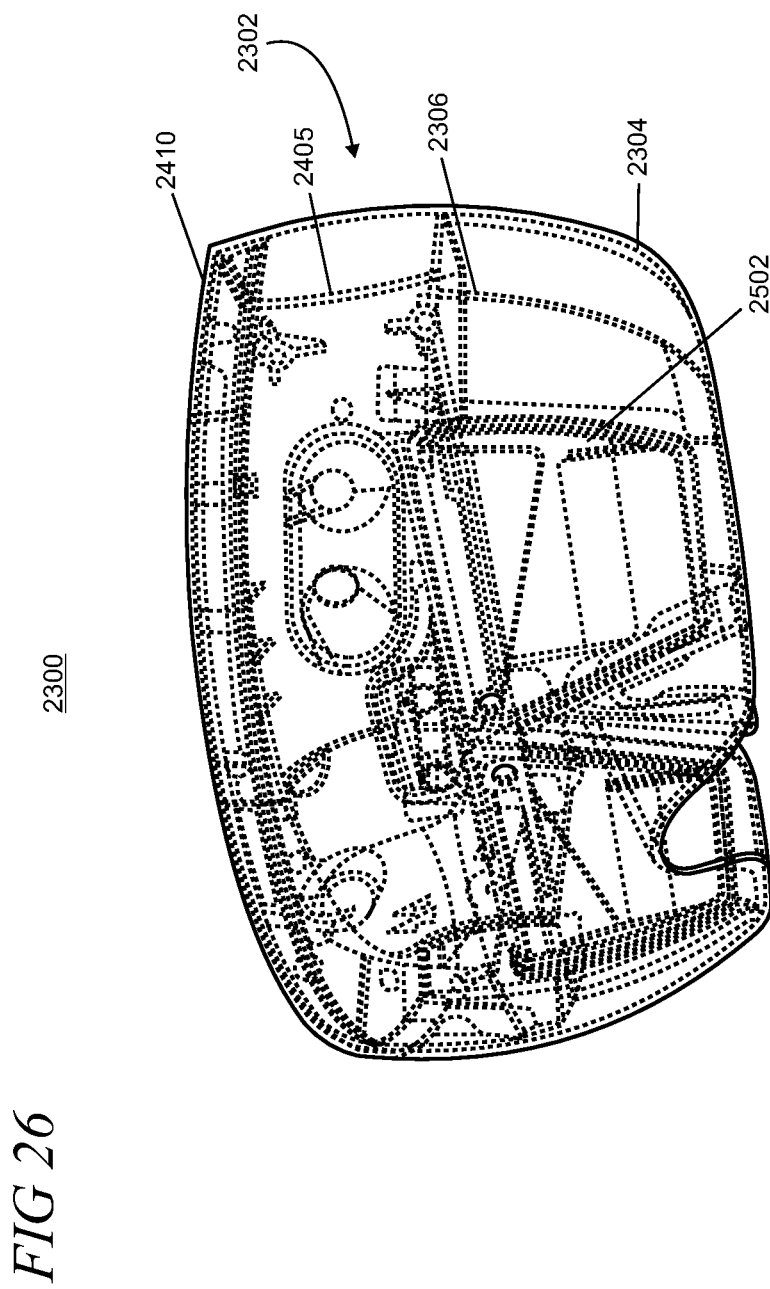
FIG. 26 shows a phantom line front view of the sealed visor.
Figure 27:
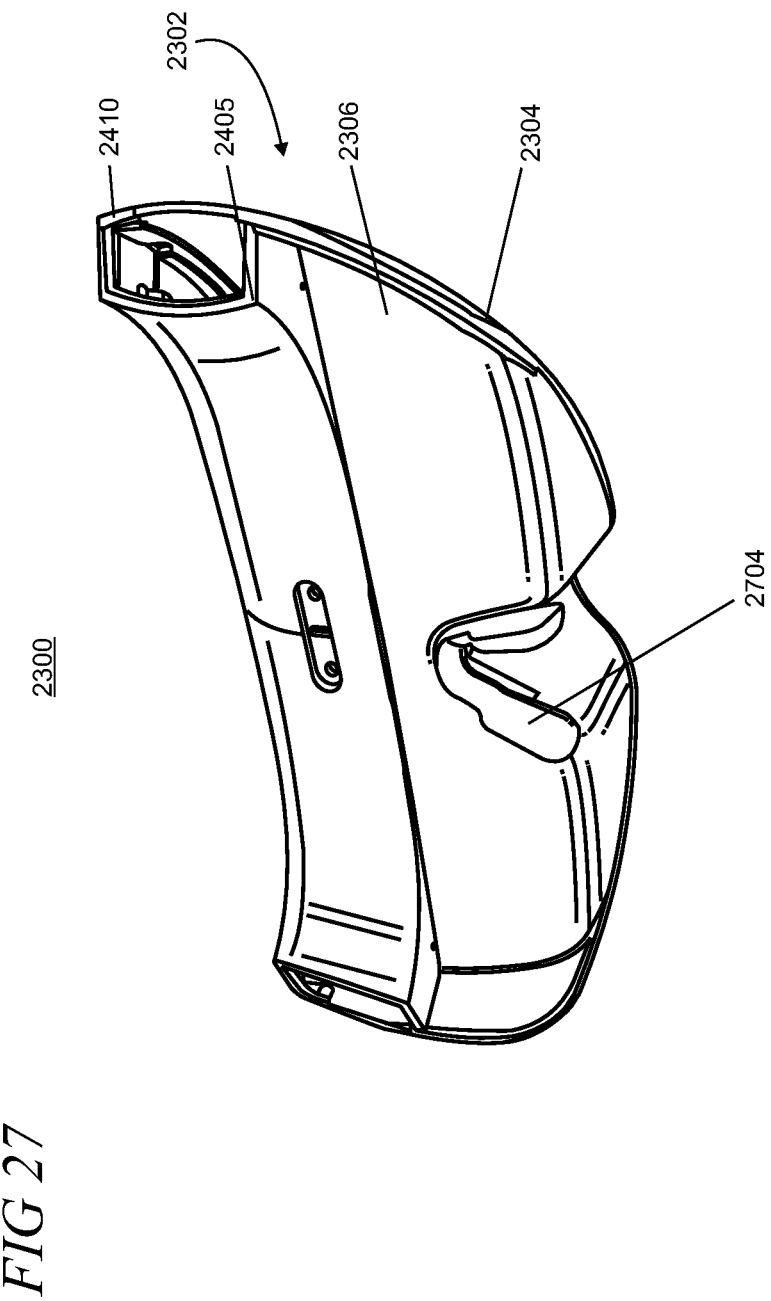
FIG. 27 shows a pictorial back view of the sealed visor.

As shown in FIGS. 25 and 27, the rear shield 2306 is configured in an ergonomically correct form to interface with the user's nose and nose pads 2704 (FIG. 27) and other comfort features can be included (e.g., molded-in and/or added-on as discrete components). The sealed visor 2302 can also incorporate some level of optical diopter curvature (i.e., eye prescription) within the molded shields in some cases.

Figure 28:
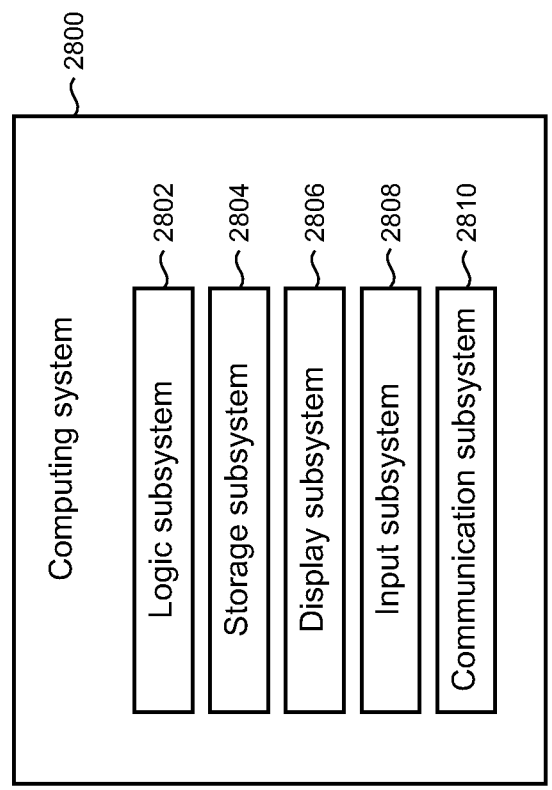
FIG. 28 shows an exemplary computing system.

FIG. 28 schematically shows a non-limiting embodiment of a computing system 2800 that can be used when implementing one or more of the configurations, arrangements, methods, or processes described above. The HMD device 104 may be one non-limiting example of computing system 2800. The computing system 2800 is shown in simplified form. It may be understood that virtually any computer architecture may be used without departing from the scope of the present arrangement. In different embodiments, computing system 2800 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 2800 includes a logic subsystem 2802 and a storage subsystem 2804. The computing system 2800 may optionally include a display subsystem 2806, an input subsystem 2808, a communication subsystem 2810, and/or other components not shown in FIG. 28.

The logic subsystem 2802 includes one or more physical devices configured to execute instructions. For example, the logic subsystem 2802 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 2802 may include one or more processors configured to execute software instructions. Additionally or alternatively, the logic subsystem 2802 may include one or more hardware or firmware logic machines configured to execute hardware or firmware instructions. The processors of the logic subsystem 2802 may be single-core or multi-core, and the programs executed thereon may be configured for sequential, parallel, or distributed processing. The logic subsystem 2802 may optionally include individual components that are distributed among two or more devices, which can be remotely located and/or configured for coordinated processing. Aspects of the logic subsystem 2802 may be virtualized and executed by remotely accessible, networked computing devices configured in a cloud-computing configuration.

The storage subsystem 2804 includes one or more physical devices configured to hold data and/or instructions executable by the logic subsystem 2802 to implement the methods and processes described herein. When such methods and processes are implemented, the state of the storage subsystem 2804 may be transformed—for example, to hold different data.

The storage subsystem 2804 may include removable media and/or built-in devices. The storage subsystem 2804 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 2804 may include volatile, nonvolatile, dynamic, static, read/write, read-only, random-access, sequential-access, location-addressable, file-addressable, and/or content-addressable devices.

It may be appreciated that the storage subsystem 2804 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 2802 and of the storage subsystem 2804 may be integrated together into one or more hardware-logic components through which the functionality described herein may be enacted. Such hardware-logic components may include field-programmable gate arrays (FPGAs), program-and application-specific integrated circuits (PASIC/ASICs), program-and application-specific standard products (PSSP/ASSPs), system-on-a-chip (SOC) systems, and complex programmable logic devices (CPLDs), for example.

When included, the display subsystem 2806 may be used to present a visual representation of data held by storage subsystem 2804. This visual representation may take the form of a graphical user interface (GUI). As the present described methods and processes change the data held by the storage subsystem, and thus transform the state of the storage subsystem, the state of the display subsystem 2806 may likewise be transformed to visually represent changes in the underlying data. The display subsystem 2806 may include one or more display devices utilizing virtually any type of technology. Such display devices may be combined with logic subsystem 2802 and/or storage subsystem 2804 in a shared enclosure in some cases, or such display devices may be peripheral display devices in others.

When included, the input subsystem 2808 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on-or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 2810 may be configured to communicatively couple the computing system 2800 with one or more other computing devices. The communication subsystem 2810 may include wired and/or wireless communication devices compatible with one or more different communication protocols. As non-limiting examples, the communication subsystem may be configured for communication via a wireless telephone network, or a wired or wireless local-or wide-area network. In some embodiments, the communication subsystem may allow computing system 2800 to send and/or receive messages to and/or from other devices using a network such as the Internet.

Various exemplary embodiments of the present gaze-based object placement within a virtual reality environment are now presented by way of illustration and not as an exhaustive list of all embodiments. An example includes a method performed by a head mounted display (HMD) device that supports rendering of a virtual reality environment, comprising: obtaining sensor data describing a real world physical environment adjoining a user of the HMD device; using the sensor data, reconstructing a geometry of the physical environment; tracking the user's head and gaze in the physical environment using the reconstructed geometry to determine a field of view and view position; projecting a gaze ray outward from the view position; identifying an intersection between the projected gaze ray and the virtual reality environment; and placing a virtual object at the intersection within the current field in response to user input.

In another example, the sensor data includes depth data and further including generating the sensor data using a depth sensor and applying surface reconstruction techniques to reconstruct the physical environment geometry. In another example, the method further includes generating depth data using depth-from-stereo imaging analyses. In another example, the method further includes identifying an intersection between the projected gaze ray and the virtual reality environment that is closest to the HMD device. In another example, the method further includes exposing a user interface (UI) for receiving the user input, the UI providing user controls or supporting gesture recognition or voice recognition. In another example, the method further includes rotating the projected gaze ray so that a placed virtual object is not clipped along an edge of the field of view. In another example, the method further includes performing the rotating so that the gaze ray is projected through a bottom portion of the field of view. In another example, the method further includes performing the rotating when the placed object cannot be rendered to fit entirely within the field of view. In another example, the placed virtual object is an interactive element supporting a user interface or a user experience in which the interactive element is one of menu, widget, or notification. In another example, the method further using one or more inward facing sensors located in the HMD device to determine the gaze direction and projecting the gaze ray from the view position along a direction of the user's gaze.

A further example includes a head mounted display (HMD) device operable by a user in a physical environment, comprising: one or more processors; a display for rendering a virtual reality environment to the user, a field of view of the rendered virtual reality environment being variable depending at least in part on a pose of the user's head in the physical environment; a sensor package; and one or more memory devices storing computer-readable instructions which, when executed by the one or more processors, perform a method comprising the steps of: generating surface reconstruction data for at least a portion of the physical environment using the sensor package, dynamically tracking a view position of the user for the virtual reality environment using the surface reconstruction data, locating an intersection between a ray projected from the view position along the user's gaze direction and a point of the virtual reality environment within a current field of view, and operating the HMD device to render a cursor at the point of intersection.

In another example, the head mounted display (HMD) device further includes using the sensor package to dynamically track the gaze direction. In another example, the head mounted display (HMD) device further includes a user interface and operating the HMD device to place a virtual object at the point of intersection responsively to a user input to the UI. In another example, the head mounted display (HMD) device further includes dynamically repositioning the cursor as the field of view or gaze direction changes. In another example, the head mounted display (HMD) device further includes modeling the physical environment using a surface reconstruction data pipeline that implements a volumetric method creating multiple overlapping surfaces that are integrated. In another example, the head mounted display (HMD) device further includes rotating the projected ray downward so that a placed virtual object, when rendered on the display, is not clipped by an upper edge of the current field of view.

A further example includes one or more computer readable memories storing computer-executable instructions for rendering a virtual reality environment within a variable field of view of a head mounted display (HMD) device located in a real world environment, the method comprising the steps of: using data from a sensor package incorporated into the HMD device to a) dynamically generate a surface reconstruction model of the real world environment and b) generate a gaze ray that is projected from a view position of a user of the HMD device; determining a field of view of the virtual reality environment using the model; receiving an input to the HMD device from the user; and placing a virtual object within the field of view at a point of intersection between the gaze ray and the virtual reality environment in response to the received user input.

In another example, the one or more computer readable memories further include tracking a gaze direction of the user, projecting the gaze ray from the view position along the gaze direction, and rendering a cursor within the field of view at a point of intersection of the gaze ray and the virtual reality environment. In another example, the one or more computer readable memories further include determining when a placed virtual object extends outside the field of view and rotating the gaze ray in response to the determining. In another example, the one or more computer readable memories further include rotating the gaze ray at an angle that is sufficient to provide a portion of the field of view that is unobstructed by the placed virtual object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method performed by a head mounted display (HMD) device that supports rendering of a virtual reality environment that excludes real world objects and includes existing virtual objects, comprising:
   obtaining sensor data describing a real world physical environment adjoining a user of the HMD device;
   using the sensor data, reconstructing a geometry of the real world physical environment;
   tracking the user's head and gaze in the real world physical environment using the reconstructed geometry to determine a field of view and view position within the virtual reality environment;
   projecting a gaze ray outward from the view position;
   identifying a point at which the projected gaze ray intersects with the virtual reality environment;
   operating the HMD device to place a virtual object at the identified point; in response to the placed virtual object being clipped along an edge of the field of view, rotating the projected gaze ray independent of movement and positioning of the user's head, eyes, or body, such that the rotating of the projected gaze ray is performed by the HMD device irrespective of the user's actions;
   locating a point at which the rotated gaze ray intersects with the virtual reality environment; and
   repositioning the virtual object at the located point for the rotated gaze ray so that the virtual object is no longer clipped along the edge of the field of view.

2. The method of claim 1 in which the sensor data includes depth data and further including generating the sensor data using a depth sensor and applying surface reconstruction techniques to reconstruct the physical environment geometry.

3. The method of claim 1 further including generating depth data using depth-from-stereo imaging analyses.

4. The method of claim 1 further including identifying a point at which the projected gaze ray intersects with the virtual reality environment that is closest to the HIVID device.

5. The method of claim 1 in which the virtual object is placed responsive to receiving user input, and further including exposing a user interface (UI) for receiving the user input, the UI providing user controls or supporting gesture recognition or voice recognition.

6. The method of claim 1 further including performing the rotating so that the gaze ray is projected through a bottom portion of the field of view, such that the bottom portion is at least on a lower half of the field of view.

7. The method of claim 1 further including performing the rotating when the placed virtual object cannot be rendered to fit entirely within the field of view.

8. The method of claim 1 in which the placed virtual object is an interactive element supporting a user interface or a user experience in which the interactive element is one of menu, widget, or notification.

9. The method of claim 1 further including using one or more inward facing sensors located in the HMD device to determine the gaze direction and projecting the gaze ray from the view position along a direction of the user's gaze.

10. The method of claim 1, in which the reconstructed geometry from the sensor data is at least partially used to determine the point at which the gaze ray intersects with the virtual reality environment.

11. A head mounted display (HMD) device operable by a user in a physical environment, comprising:
   one or more processors;
   a display for rendering a virtual reality environment to the user, a field of view of the rendered virtual reality environment being variable depending at least in part on a pose of the user's head in the physical environment;

a sensor package; and one or more memory devices storing computer-readable instructions which, when executed by the one or more processors, perform a method comprising the steps of:

generating surface reconstruction data for at least a portion of the physical environment using the sensor package, dynamically tracking a view position of the user for the virtual reality environment using the surface reconstruction data, locating a point at which a gaze ray projected from the view position along the user's gaze direction intersects with the virtual reality environment within a current field of view, operating the HMD device to place a virtual object at the located point;

in response to the placed virtual object being clipped along an edge of the field of view, rotating the projected gaze ray independent of movement and positioning of the user's head, eyes, or body, such that the rotating of the projected gaze ray is performed by the HMD device irrespective of the user's actions;

locating a point at which the rotated gaze ray intersects with the virtual reality environment; and repositioning the virtual object at the located point for the rotated gaze ray so that the virtual object is no longer clipped along the edge of the field of view.

12. The HMD device of claim 11 in which the method further comprises a step of using the sensor package to dynamically track the direction.

13. The HMD device of claim 11 in which the method further comprises a step of modeling the physical environment using a surface reconstruction data pipeline that implements a volumetric method creating multiple overlapping surfaces that are integrated.

14. The HMD device of claim 11 in which the projected gaze ray is rotated downward so that the placed virtual object, when rendered on the display, is not clipped by an upper edge of the field of view.

15. One or more hardware-based computer readable memories not consisting of propagated signals storing computer-executable instructions for rendering a virtual reality environment within a variable field of view of a head mounted display (HMD) device located in a real world environment, the instructions when executed by one or more processors disposed in the HMD device cause the HMD device to:

use data from a sensor package incorporated into the HMD device to a) dynamically generate a surface reconstruction model of the real world environment and b) generate a gaze ray that is projected from a view position of a user of the HMD device within the virtual reality environment using the surface reconstruction model of the real world environment;

determine a field of view of the virtual reality environment using the surface reconstruction model;

receive an input to the HMD device from the user;

place a virtual object within the field of view at a point at which the gaze ray intersects with the virtual reality environment in response to the received user input;

in response to the virtual object being clipped along an edge of the field of view within the virtual reality environment, rotate the virtual object independent of movement and positioning of the user's head, eyes, or body, such that the rotation of the projected gaze ray is performed by the HMD device irrespective of the user's actions;

locate a point at which the rotated gaze ray intersects with the virtual reality environment; and reposition the virtual object at the located point for the rotated gaze ray so that the virtual object is no longer clipped along the edge of the field of view.

16. The one or more hardware-based computer readable memories of claim 15 in which the executed instructions further cause the HMD device to track a gaze direction of the user, project the gaze ray from the view position along the gaze direction, and render a cursor within the field of view at the point which the gaze ray intersects with the virtual reality environment.

17. The one or more hardware-based computer-readable memories of claim 15 in which the executed instructions further cause the HMD device to rotate the gaze ray at an angle that is sufficient to provide a portion of the field of view that is unobstructed by the placed virtual object.

* * * * *